United States Patent
Bell et al.

(10) Patent No.: US 12,296,353 B2
(45) Date of Patent: May 13, 2025

(54) SPRAY HEAD SPRINKLER

(71) Applicant: Hunter Industries, Inc., San Marcos, CA (US)

(72) Inventors: James A Bell, Vista, CA (US); Ryan Christopher Bone, Del Mar, CA (US); Kevin M. Klein, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 1092 days.

(21) Appl. No.: 17/205,957

(22) Filed: Mar. 18, 2021

(65) Prior Publication Data

US 2022/0297139 A1 Sep. 22, 2022

(51) Int. Cl.
| | |
|---|---|
| *B05B 1/34* | (2006.01) |
| *B05B 1/04* | (2006.01) |
| *B05B 1/26* | (2006.01) |
| *B05B 1/30* | (2006.01) |
| *B05B 3/02* | (2006.01) |
| *B05B 3/04* | (2006.01) |
| *B05B 15/74* | (2018.01) |

(52) U.S. Cl.
CPC .............. *B05B 3/0454* (2013.01); *B05B 1/34* (2013.01); *B05B 3/021* (2013.01); *B05B 1/04* (2013.01); *B05B 1/262* (2013.01); *B05B 1/3073* (2013.01); *B05B 15/74* (2018.02)

(58) Field of Classification Search
CPC ........... B05B 1/04; B05B 1/262; B05B 1/265; B05B 1/267; B05B 1/304; B05B 1/3073; B05B 1/32; B05B 1/34; B05B 3/031; B05B 3/0454; B05B 15/70; B05B 15/72; B05B 15/74
See application file for complete search history.

(56) References Cited

U.S. PATENT DOCUMENTS

| | | |
|---|---|---|
| 3,131,867 A | 5/1964 | Miller et al. |
| 3,884,416 A | 5/1975 | King |
| 3,934,820 A | 1/1976 | Phaup |
| 3,940,066 A | 2/1976 | Hunter |
| 3,955,764 A | 5/1976 | Phaup |
| 4,119,275 A | 10/1978 | Hunter |
| 4,131,234 A | 12/1978 | Pescetto |
| 4,154,404 A | 5/1979 | Clawson |
| 4,189,099 A | 2/1980 | Bruninga |
| 4,220,283 A | 9/1980 | Citron |
| 4,261,515 A | 4/1981 | Rosenberg et al. |
| 4,471,908 A | 9/1984 | Hunter |
| 4,579,285 A | 4/1986 | Hunter |
| 4,634,052 A | 1/1987 | Grizzle et al. |

(Continued)

FOREIGN PATENT DOCUMENTS

WO  WO 03/086643 A1  10/2003

OTHER PUBLICATIONS

International Search Report for application No. 07002672.9-1268 dated Mar. 11, 2008.

(Continued)

*Primary Examiner* — Darren W Gorman
(74) *Attorney, Agent, or Firm* — KNOBBE MARTENS OLSON & BEAR LLP

(57) ABSTRACT

An adjustable arc irrigation spray nozzle can include one or more features including a dual orifice, a multi-trajectory ramp, radial ribs, an impedance wall, and/or a variable orifice.

20 Claims, 22 Drawing Sheets

(56) References Cited

U.S. PATENT DOCUMENTS

| | | |
|---|---|---|
| RE32,386 E | 3/1987 | Hunter |
| 4,697,961 A | 10/1987 | De Boodt et al. |
| 4,739,834 A | 4/1988 | Peiffer et al. |
| 4,790,481 A | 12/1988 | Ray et al. |
| 4,815,662 A | 3/1989 | Hunter |
| 4,834,289 A | 5/1989 | Hunter |
| 4,842,201 A | 6/1989 | Hunter |
| 4,850,532 A | 7/1989 | Mackanos |
| 4,867,379 A | 9/1989 | Hunter |
| 4,898,332 A | 2/1990 | Hunter et al. |
| 4,913,352 A | 4/1990 | Witty et al. |
| 4,932,590 A | 6/1990 | Hunter |
| 4,939,797 A | 7/1990 | Goettl |
| 4,944,456 A | 7/1990 | Zakai |
| 4,967,961 A | 11/1990 | Hunter |
| 4,971,250 A | 11/1990 | Hunter |
| 4,986,474 A | 1/1991 | Schisler et al. |
| 5,031,840 A | 7/1991 | Grundy et al. |
| 5,050,800 A | 9/1991 | Lamar |
| 5,058,806 A | 10/1991 | Rupar |
| 5,083,709 A | 1/1992 | Iwanowski |
| RE33,823 E | 2/1992 | Nelson et al. |
| 5,098,021 A | 3/1992 | Kah, Jr. |
| 5,148,990 A | 9/1992 | Kah, Jr. |
| 5,205,491 A | 4/1993 | Hadar |
| 5,226,602 A | 7/1993 | Cochran et al. |
| 5,288,022 A | 2/1994 | Sesser |
| 5,322,223 A | 6/1994 | Hadar |
| 5,360,167 A | 11/1994 | Grundy et al. |
| 5,524,824 A | 6/1996 | Frimmer |
| 5,556,036 A | 9/1996 | Chase |
| 5,588,594 A | 12/1996 | Kah, Jr. |
| 5,642,861 A | 7/1997 | Ogi et al. |
| 5,647,541 A | 7/1997 | Nelson |
| 5,762,270 A | 6/1998 | Kearby et al. |
| 5,779,148 A | 7/1998 | Saarem et al. |
| 5,823,440 A | 10/1998 | Clark |
| 5,927,607 A | 7/1999 | Scott |
| 6,145,758 A | 11/2000 | Ogi et al. |
| 6,158,675 A | 12/2000 | Ogi |
| 6,223,999 B1 | 5/2001 | Lemelshtrich et al. |
| 6,244,521 B1 | 6/2001 | Sesser |
| 6,488,218 B1 | 12/2002 | Townsend et al. |
| 6,499,672 B1 | 12/2002 | Sesser |
| 6,530,531 B2 | 3/2003 | Butler |
| 6,622,933 B1 | 9/2003 | Young et al. |
| 6,651,905 B2 | 11/2003 | Sesser et al. |
| 6,688,539 B2 | 2/2004 | Griend |
| 6,736,332 B2 | 5/2004 | Sesser et al. |
| 6,769,633 B1 * | 8/2004 | Huang .................... B05B 1/265 239/513 |
| 6,942,164 B2 | 9/2005 | Walker |
| 6,957,782 B2 | 10/2005 | Clark et al. |
| 7,032,836 B2 | 4/2006 | Sesser et al. |
| 7,159,795 B2 | 1/2007 | Sesser et al. |
| 7,168,634 B2 | 1/2007 | Onofrio |
| 7,240,860 B2 | 7/2007 | Griend |
| 7,303,153 B2 * | 12/2007 | Han ........................ B05B 1/267 239/203 |
| 7,322,533 B2 | 1/2008 | Grizzle |
| RE40,440 E | 7/2008 | Sesser |
| 7,621,467 B1 * | 11/2009 | Garcia .................... B05B 1/267 239/457 |
| 8,651,400 B2 * | 2/2014 | Walker .................... B05B 1/267 239/487 |
| 9,056,214 B2 * | 6/2015 | Barmoav ................ A62C 31/02 |
| 9,174,227 B2 * | 11/2015 | Robertson ................ B05B 3/08 |
| 9,427,751 B2 * | 8/2016 | Kim ........................ B05B 1/3073 |
| 2008/0169363 A1 | 7/2008 | Walker |
| 2011/0248097 A1 | 10/2011 | Kim |

OTHER PUBLICATIONS

"Pro-Spray@," Hunter, The Irrigation Innovators brochure, 6 pages, May 2005.

International Search Report and Written Opinion issued in corresponding application No. PCT/US2022/020501 dated Aug. 26, 2022.

* cited by examiner

SPRAY HEAD SPRINKLER

TECHNICAL FIELD

The present inventions relate to apparatus for irrigating turf and landscaping, and more particularly, to an improved spray head sprinkler.

BACKGROUND

In many parts of the United States, rainfall is insufficient and/or too irregular to keep turf and landscaping green and therefore irrigation systems are installed. Such systems typically include a plurality of underground pipes connected to sprinklers and valves; the latter being controlled by an electronic irrigation controller. One of the most popular types of sprinklers are spray type sprinklers. Spray type sprinklers are well known in the irrigation art and typically include a spray nozzle that is screwed to the upper end of a fixed vertical riser or a telescoping vertical riser in the case of a so-called pop-up sprinkler. In this type of pop-up sprinkler, a tubular member is normally retracted into an outer cylindrical case by a coil spring. The case is buried in the ground and when pressurized water is fed to the sprinkler the tubular member extends telescopically in an upward direction.

The spray nozzle is usually a generally cylindrical construction made of plastic parts. One type has a fixed arc opening (e.g., 90 degrees, 180 degrees, 360 degrees) which distributes water radially in a relatively thin fan-shaped pattern to close-in vegetation. Another type has an adjustable arc opening. The adjustable arc spray orifice can be adjusted from about 0 degrees to 360 degrees.

SUMMARY

In some embodiments, an adjustable spray nozzle comprises a lower member and an upper member rotatably coupled to the lower member to vary a size of an arc opening for water to exit the nozzle. The lower member and the upper member define a path for the water to flow from a passage within the lower member to an exit of the nozzle. The path includes an upstream orifice located downstream from the passage. The nozzle further comprises a manifold located downstream of the upstream orifice and a downstream orifice located downstream of the manifold. The upstream orifice defines a first gap, the downstream orifice defines a second gap, and the manifold defines a third gap. The third gap is sized greater than the first gap to cause a sudden expansion and drop in pressure of the water exiting the first gap and entering the manifold.

In some embodiments, a cross-sectional area of the third gap is greater than a cross-sectional area of the first gap.

In some embodiments, the second gap is smaller than the third gap.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the manifold is configured to decrease a range of water otherwise distributed from the exit.

In some embodiments, the upper member and the lower member have generally cylindrical shapes.

In some embodiments, an adjustable spray nozzle comprises a lower member and an upper member rotatably coupled to the lower member to vary a size of an arc opening for water to exit the nozzle. The lower member and the upper member define a path for the water to flow from a passage within the lower member to an exit of the nozzle. The path includes a plurality of orifices and a manifold. The manifold is disposed between at least two orifices of the plurality of orifices. At least one of the plurality of orifices defines a gap upstream of the manifold. The gap is sized smaller than the manifold to cause a sudden expansion and drop in pressure of the water exiting the gap and entering the manifold.

In some embodiments, another of the plurality of orifices defines a second gap, the second gap being disposed downstream of the manifold.

In some embodiments, the second gap is sized smaller than the manifold.

In some embodiments, the manifold is disposed between portions of the lower member and the upper member.

In some embodiments, the manifold has a generally annular shape.

In some embodiments, the upper member follows a helical path about a central axis of the nozzle when rotated relative to the lower member.

In some embodiments, an adjustable spray nozzle comprises a lower member having an inlet, an upper member rotatably coupled to the lower member to vary a size of an arc opening for water to exit the nozzle, a flow path defined by the lower member and the upper member for the water to flow from the inlet to the arc opening, an upstream orifice disposed along the flow path and downstream from the inlet, the upstream orifice defining a first gap, a downstream orifice disposed along the flow path and downstream from the upstream orifice, the downstream orifice defining a second gap, and a manifold disposed along the flow path and between the upstream orifice and the downstream orifice. The manifold defines a third gap that is sized greater than the first gap to cause a sudden expansion and drop in pressure of the water exiting the first gap and entering the manifold.

In some embodiments, the second gap is sized smaller than the third gap.

In some embodiments, the manifold is disposed between portions of the lower member and the upper member.

In some embodiments, the upper member and the lower member are connected by a screw.

In some embodiments, an adjustable spray nozzle comprises a lower member and an upper member rotatably coupled to the lower member to vary a size of an arc opening for water to exit the nozzle. The lower member and the upper member define a path for the water to flow from a passage within the lower member, through an orifice, and then to an exit of the nozzle. The exit comprises opposing surfaces of the upper member and the lower member. The upper member comprises one or more ramps having a convex surface.

In some embodiments, the convex surface is a curved surface.

In some embodiments, the convex surface comprises at least one arc.

In some embodiments, the convex surface comprises at least one line segment.

In some embodiments, the convex surface comprises three line segments.

In some embodiments, the three line segments are configured as a head water ramp, a mid-level ramp, and a radial ramp, respectively.

In some embodiments, at least two of the three line segments have different lengths.

In some embodiments, the convex surface comprises at least one line segment and at least one arc.

In some embodiments, the convex surface extends in a radial direction away from a central axis of the nozzle.

In some embodiments, at least a portion of the convex surface extends parallel to a direction of the water exiting the nozzle.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, an adjustable spray nozzle comprises a lower member having an inlet, an upper member rotatably coupled to the lower member to vary a size of an arc opening for water to exit the nozzle. The upper member comprises one or more ramps having a convex surface. A flow path is defined by the lower member and the upper member for the water to flow from the inlet to the arc opening. The nozzle further comprises an orifice disposed along the flow path and downstream from the inlet and an exit disposed downstream of the orifice and comprising the one or more ramps.

In some embodiments, the convex surface is a curved surface.

In some embodiments, the convex surface comprises at least one arc.

In some embodiments, the convex surface comprises at least one line segment.

In some embodiments, the convex surface comprises three line segments.

In some embodiments, the three line segments are configured as a head water ramp, a mid-level ramp, and a radial ramp, respectively.

In some embodiments, at least two of the three line segments have different lengths.

In some embodiments, the convex surface comprises at least one line segment and at least one arc.

In some embodiments, the convex surface extends in a radial direction away from a central axis of the nozzle.

In some embodiments, at least a portion of the convex surface extends parallel to a direction of the water exiting the nozzle.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, an adjustable spray nozzle comprises a lower member and an upper member rotatably coupled to the lower member to vary a size of an arc opening for water to exit the nozzle. The lower member and the upper member define a path for the water to flow from a passage within the lower member, through an orifice, and then to an exit of the nozzle. The exit comprises opposing surfaces of the upper member and the lower member. The lower member comprises a plurality of ribs having top surfaces. The top surfaces is located at different heights relative to the exit so as to allow at least some of the water exiting the nozzle to pass between at least some of the plurality of ribs.

In some embodiments, the plurality of ribs comprise three different groups of ribs.

In some embodiments, the three different groups of ribs include one or more high ribs, one or more medium ribs, and one or more low ribs.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, an adjustable spray nozzle comprises a lower member having an inlet and a plurality of ribs, an upper member rotatably coupled to the lower member to vary a size of an arc opening for water to exit the nozzle, a flow path defined by the lower member and the upper member for the water to flow from the inlet to the arc opening, an orifice disposed along the flow path and downstream from the inlet, and an exit disposed downstream of the orifice and comprising the plurality of ribs. The plurality of ribs have top surfaces located at different heights relative to the exit so as to allow at least some of the water exiting the nozzle to pass between at least some of the plurality of ribs.

In some embodiments, the plurality of ribs comprise three different groups of ribs.

In some embodiments, the three different groups of ribs include one or more high ribs, one or more medium ribs, and one or more low ribs.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, an adjustable spray nozzle comprises a lower member and an upper member rotatably coupled to the lower member to vary a size of an arc opening for water to exit the nozzle. The lower member and the upper member define a path for the water to flow from a passage within the lower member to an exit of the nozzle. The path includes an orifice located downstream from the passage and a manifold located upstream of the orifice and an impedance wall disposed at least partially in the manifold.

In some embodiments, the impedance wall is disposed within a central hole of the nozzle.

In some embodiments, the impedance wall is configured to inhibit water within the nozzle from interfering with water flow exiting the orifice.

In some embodiments, the impedance wall projects inward toward a central axis.

In some embodiments, the impedance wall has a rectangular shape.

In some embodiments, the impedance wall has a planar shape.

In some embodiments, the impedance wall is configured to inhibit water on a backside of the arc opening from interfering with water flow exiting the orifice.

In some embodiments, the impedance wall is configured to inhibit water flowing in a circumferential direction and interfering with the water flow exiting the orifice.

In some embodiments, the impedance wall extends across at least 50 percent of the manifold towards a central axis of the nozzle.

In some embodiments, the impedance wall extends in an axial direction within the manifold.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, further comprises a second impedance wall disposed at least partially in the manifold.

In some embodiments, the path includes a second orifice, and wherein the second impedance wall is disposed so as to inhibit water from interfering with water exiting the second orifice.

In some embodiments, an adjustable spray nozzle comprises a lower member having an passage, an upper member rotatably coupled to the lower member to vary a size of an arc opening for water to exit the nozzle, a flow path defined by the lower member and the upper member for the water to flow from the passage to the arc opening, an orifice disposed along the flow path and downstream from the passage, a manifold disposed along the flow path and upstream of the orifice, and an impedance wall disposed at least partially in the manifold.

In some embodiments, the impedance wall is disposed within a central hole of the nozzle.

In some embodiments, the impedance wall is configured to inhibit water within the nozzle from interfering with water flow exiting the orifice.

In some embodiments, the impedance wall projects inward toward a central axis.

In some embodiments, the impedance wall has a rectangular shape.

In some embodiments, the impedance wall has a planar shape.

In some embodiments, the impedance wall is configured to inhibit water on a backside of the arc opening from interfering with water flow exiting the orifice.

In some embodiments, the impedance wall is configured to inhibit water flowing in a circumferential direction and interfering with the water flow exiting the orifice.

In some embodiments, the impedance wall extends across at least 50 percent of the manifold towards a central axis of the nozzle.

In some embodiments, the impedance wall extends in an axial direction within the manifold.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, further comprising a second impedance wall disposed at least partially in the manifold.

In some embodiments, the path includes a second orifice, and wherein the second impedance wall is disposed so as to inhibit water from interfering with water exiting the second orifice.

In some embodiments, an adjustable spray nozzle comprises a lower member and an upper member rotatably coupled to the lower member to vary a size of an arc opening for water to exit the nozzle. The lower member and the upper member define a path for the water to flow from a passage within the lower member, through an orifice, and then to an exit of the nozzle. The orifice has a variable width along at least a portion of a length of the arc opening.

In some embodiments, the variable width is predetermined based on a predicted precipitation rate of the nozzle along the arc opening.

In some embodiments, the variable width corrects for uneven precipitation rates that are caused by energy losses and restrictions in the flow path.

In some embodiments, the variable width of the orifice extends for at least a portion of the length of the arc opening.

In some embodiments, the variable width comprises a first width at a first location within the arc opening and a second width at a second location within the arc opening, the second width being different than the first width.

In some embodiments, the variable width of the orifice includes a step.

In some embodiments, the variable width of the orifice includes a taper.

In some embodiments, the variable width of the orifice is defined by a geometric variation.

In some embodiments, the orifice is defined by a mating surface of the lower member and a mating surface of the upper member, the variable width of the orifice being formed by a geometric variation in the mating surface of the lower member.

In some embodiments, the orifice is defined by a mating surface of the lower member and a mating surface of the upper member, the variable width of the orifice being formed by a geometric variation in the mating surface of the upper member.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

In some embodiments, an adjustable spray nozzle comprises a lower member having an inlet, an upper member rotatably coupled to the lower member to vary a size of an arc opening for water to exit the nozzle, a flow path defined by the lower member and the upper member for the water to flow from the inlet to the arc opening, and an orifice disposed along the flow path and downstream from the inlet, the orifice having a variable width along at least a portion of a length of the arc opening.

In some embodiments, the variable width is predetermined based on a predicted precipitation rate of the nozzle along the arc opening.

In some embodiments, the variable width corrects for uneven precipitation rates that are caused by energy losses and restrictions in the flow path.

In some embodiments, the variable width of the orifice extends for at least a portion of the length of the arc opening.

In some embodiments, the variable width comprises a first width at a first location within the arc opening and a second width at a second location within the arc opening, the second width being different than the first width.

In some embodiments, the variable width of the orifice includes a step.

In some embodiments, the variable width of the orifice includes a taper.

In some embodiments, the variable width of the orifice is defined by a geometric variation.

In some embodiments, the orifice is defined by a mating surface of the lower member and a mating surface of the upper member, the variable width of the orifice being formed by a geometric variation in the mating surface of the lower member.

In some embodiments, the orifice is defined by a mating surface of the lower member and a mating surface of the upper member, the variable width of the orifice being formed by a geometric variation in the mating surface of the upper member.

In some embodiments, the exit is configured to create a fan-shape for the water exiting the nozzle.

In some embodiments, the upper member follows a helical path about a central axis of the nozzle when rotated relative to the lower member.

In some embodiments, the upper member and the lower member are connected by a screw.

In some embodiments, the lower member includes a central sleeve through which the screw is threaded.

In some embodiments, the lower member has a threaded segment configured to screw to a riser.

In some embodiments, the upper member and the lower member have generally cylindrical shapes.

DETAILED DESCRIPTION

Figure 1:
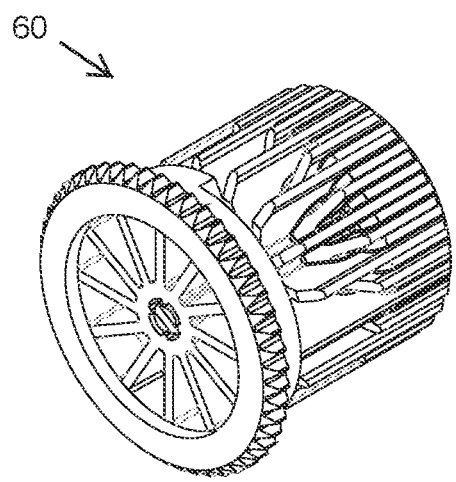
FIG. 1 is a perspective view of an adjustable spray nozzle that includes a rotatable upper member which adjusts an arc of spray coverage according to a preferred embodiment of the present invention.

FIG. 1 is a perspective view of an adjustable spray nozzle 60. In certain embodiments, the adjustable spray nozzle 60 includes an upper member 62 and a lower member 64. In the illustrated embodiment, the upper member 62 is rotatable relative to the lower member 64.

In certain embodiments, the upper member 62 and the lower member 64 together define a flow path 65 (FIG. 10) through the spray nozzle 60 and to an exit 61. In the illustrated embodiment, portions of the flow path 65 are defined by both the upper member 62 and the lower member 64.

Figure 9:
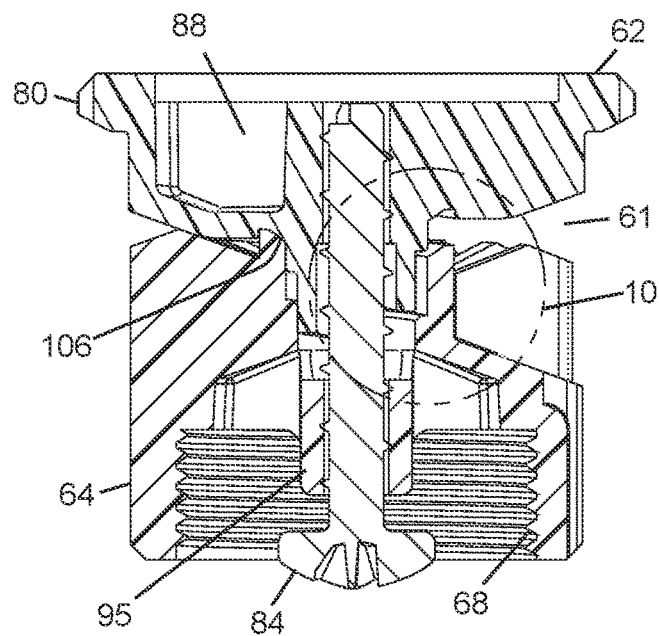
FIG. 9 is a cross-section view of the adjustable spray nozzle of FIG. 1 taken along line 9-9 in FIG. 7 and shows the upper member rotatably coupled to a lower member.
Figure 10:
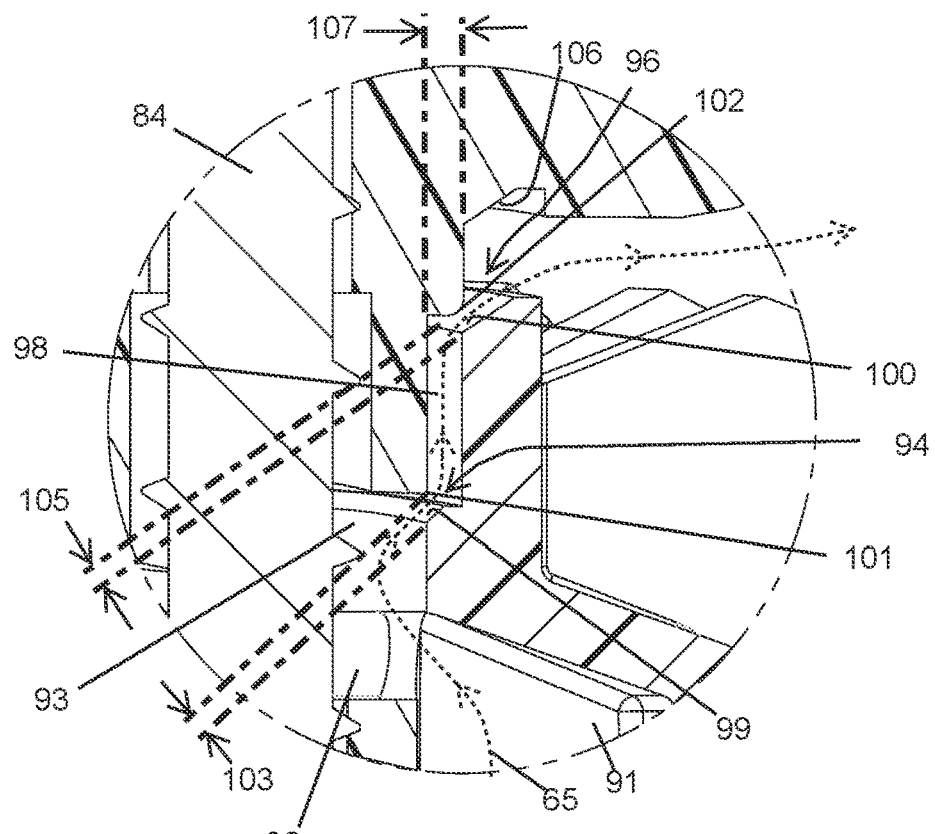
FIG. 10 is an enlarged view of a portion of FIG. 9 taken in the arc region and showing a water flow path that includes an upstream orifice and a downstream orifice located downstream of the upstream orifice.

In certain embodiments, the flow path 65 comprises one or more orifices 66 arranged in series along the flow path 65 and upstream of the exit 61 (FIG. 9). For example, in certain embodiments, the flow path 65 comprises an upstream or expansion orifice 94 and a downstream or primary orifice 96 (FIG. 10). Rotation of the upper member 62 relative to the lower member 64 adjusts at least a size of an arc of the primary orifice.

In certain embodiments, surfaces of the exit 61 are disposed downstream of the one or more orifices 66 to direct or deflect water exiting the one or more orifices 66 creating the desired water spray pattern. In certain embodiments, the exit 61 comprises opposing surfaces of the upper member 62 and the lower member 64 that are downstream of the one or more orifices 66. For example, in certain embodiments, the opposing surface of the upper member 62 comprises one or more ramps 67 (FIGS. 15, 19-30) and the opposing surface of the lower member 64 comprises one or more ribs 69 (FIGS. 11, 19-24). In certain embodiments, the one or more ramps 67 of the upper member 62 defines the spray pattern of the water contacting the ground within the selected size of the arc opening. In certain embodiments, the one or more ramps 67 of the upper member 62 and the one or more ribs 69 of the lower member 64 define the spray pattern of the water contacting the ground within the selected size of the arc opening. In this way, in certain embodiments, a top surface and a bottom surface of the exit 61 is defined by the one or more ramps 67 and the one or more ribs 69, respectively.

Figure 2:
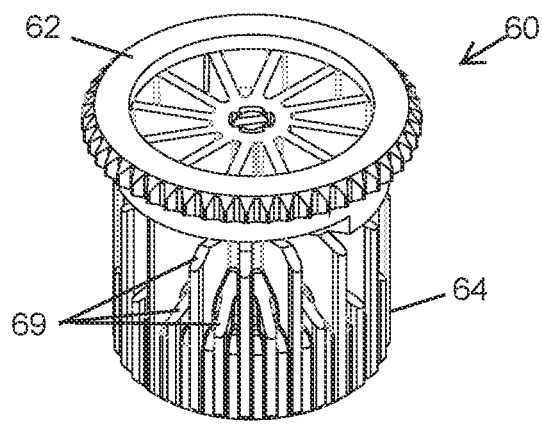
FIG. 2 is top front perspective view of the adjustable spray nozzle of FIG. 1.

FIG. 2 is top front perspective view of the adjustable spray nozzle 60 of FIG. 1. In the illustrated embodiment, clockwise rotation of the upper member 62 relative to the lower member 64 reduces a size of the arc of the one or more orifices 66. Similarly, counterclockwise rotation of the upper member 62 relative to the lower member 64 increases the size of the arc of the one or more orifices 66. In other embodiments, clockwise rotation of the upper member 62 relative to the lower member 64 increases the size of the arc of the one or more orifices 66 while counterclockwise rotation of the upper member 62 relative to the lower member 64 decreases the size of the arc of the one or more orifices 66.

In certain embodiments, the size of the arc of the one or more orifices 66 ranges from 0 degrees to 360 degrees depending on the rotational position of the upper member 62 relative to the lower member 64. In other embodiments, the size of the arc of the one or more orifices 66 has a different range than 0 degrees to 360 degrees. For example, in certain embodiments, the size of the arc of the one or more orifices 66 ranges from 0 degrees to 270 degrees, from 0 degrees to 180 degrees, or from 0 degrees to 90 degrees, or any other desired range.

Figure 3:
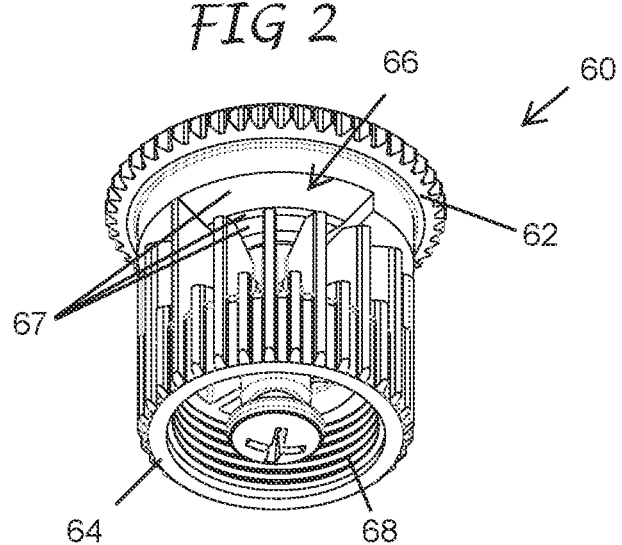
FIG. 3 is a bottom front perspective view of the adjustable spray nozzle of FIG. 1.

FIG. 3 is a bottom front perspective view of the adjustable spray nozzle 60 of FIG. 1. In the illustrated embodiment, the spray nozzle 60 has a female threaded segment 68. In certain embodiments, the female threaded segment 68 can be screwed over a male threaded upper end of an inner tubular member 74 (FIG. 6).

Figures 4, 5, 6:
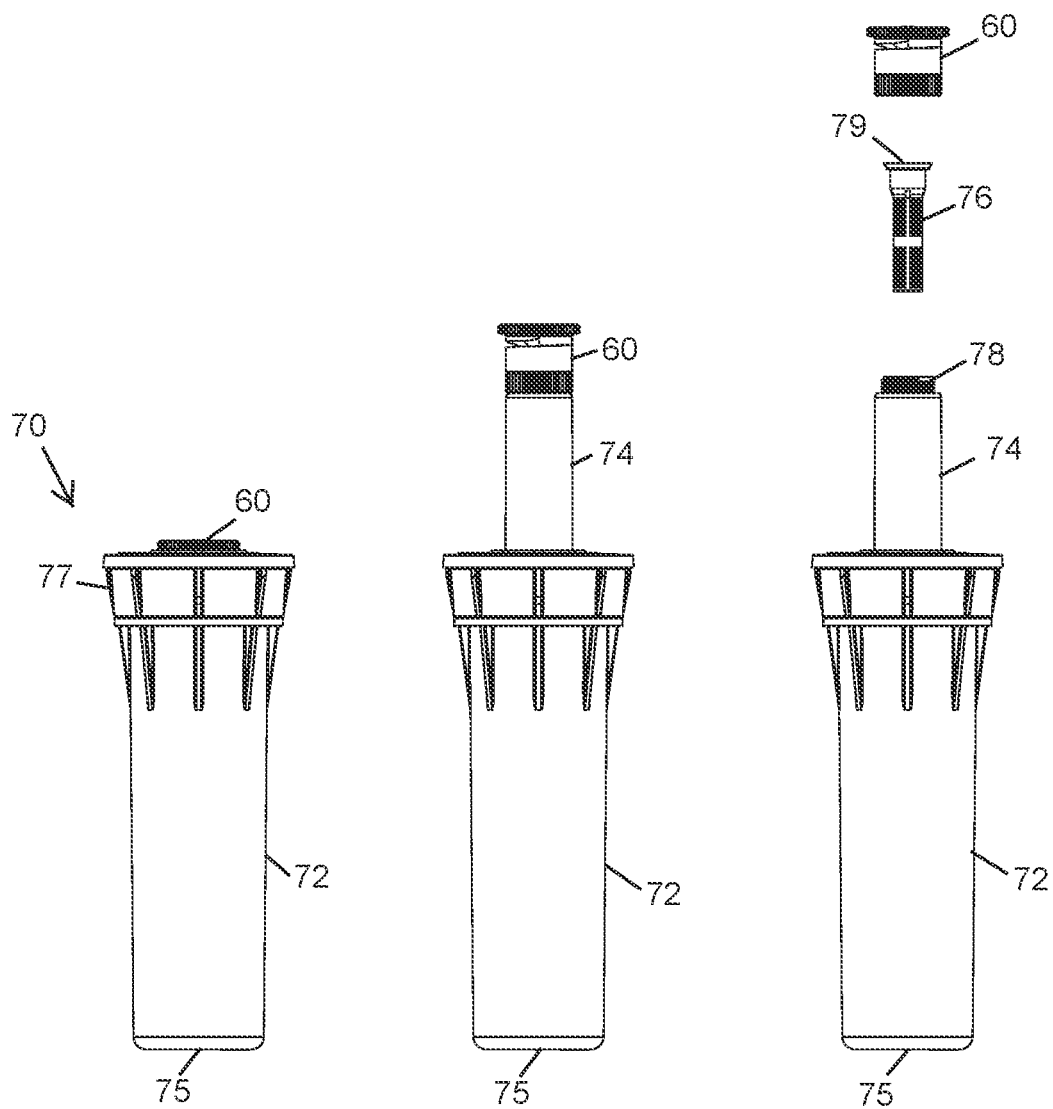
FIG. 4 is a side view of an example pop-up irrigation sprinkler that includes an outer tubular member and an inner tubular member in a retracted position within the outer tubular member. The adjustable spray nozzle of FIG. 1 is attached to an end of the inner tubular member.
FIG. 5 is a view similar to FIG. 4 except the inner tubular member has moved from the retracted position illustrated in FIG. 3 to an extended position revealing the adjustable spray nozzle of FIG. 1.
FIG. 6 is a view similar to FIG. 5 except the adjustable spray nozzle has been removed from the end of the inner tubular member and a screen located within the inner tubular member has been removed from the inner tubular member.

FIG. 4 is a side view of an example pop-up irrigation sprinkler 70 that includes an outer tubular member 72 and the inner tubular member 74 in a retracted position within the outer tubular member 72. Except for the water spray pattern enhancing features described hereafter, the sprinkler 70 can be similar in overall construction and operation to the sprinkler disclosed in the U.S. Pat. No. 10,850,295 granted Dec. 1, 2020, and assigned to Hunter Industries, Inc., the entire disclosure of which is hereby incorporated by reference.

In certain embodiments, the inner tubular member 74 can be a smaller elongate body with an inner passage, an inlet end, and an outlet end. The inner tubular member 74 can be disposed at least partially within the outer tubular member 72. For example, the inner tubular member 74 can be disposed within a fluid passage of the outer tubular member 72. In certain embodiments, the inner tubular member 74 can be substantially concentric with the outer tubular member 72. The adjustable spray nozzle 60 of FIG. 1 is attached to an end of the inner tubular member 74.

FIG. 5 is a view similar to FIG. 4 except the inner tubular member 74 has moved from the retracted position illustrated in FIG. 4 to an extended position revealing the adjustable spray nozzle 60 of FIG. 1. In certain embodiments, the outer tubular member 72 can have an elongate body with an inner passage. The outer tubular member 72 can have an inlet 75 for receiving an inflow of water and an outlet for the water to exit the outer tubular member 72 and enter the inner tubular member 74. In certain embodiments, the inlet 75 can be at a first end of the sprinkler 70.

In certain embodiments, the sprinkler 70 can include a body cap 77. The body cap 77 can be configured to be mounted at or near a second end of the outer tubular member 72. The body cap 77 can have internal threads engaging external threads at or near the second end of the outer tubular member 72.

The inner tubular member 74 can be reciprocable within the inner passage of the outer tubular member 72 along the longitudinal axis of the outer tubular member 72. When not in use (e.g., when pressurized water is not provided to the inlet 75 of the outer tubular member 72) the inner tubular member 74 and the nozzle 60 can be in the retracted position. In certain embodiments, a portion of greater outer diameter of the nozzle 60 can be flush or substantially flush with a flat surface of the body cap 77 when the inner tubular member 74 is in the retracted position. In certain embodiments, a portion of greater outer diameter of the nozzle 60 can be above a flat surface of the body cap 77 when the inner tubular member 74 is in the retracted position. In certain embodiments, the nozzle 60 is at or substantially at a ground surface level when the inner tubular member 74 is in the retracted position.

The inner tubular member 74 can be biased in the retracted position by a coil spring. When in use, pressurized water from the inlet 75 can push the inner tubular member 74 into the extended position. The water pressure can be sufficient to overcome the biasing force of the coil spring. The inner tubular member 74 and the nozzle 60 can telescope from the outer tubular housing 72 in the extended position. In some embodiments, the nozzle 60 can extend above the ground surface level at a predetermined height in the extended position. When the water is turned off, the inner tubular member 74 can return to the retracted position due to the biasing force of the coil spring.

FIG. 6 is a view similar to FIG. 5 except the adjustable spray nozzle 60 has been removed from the end of the inner tubular member 74 and a screen or filter 76 located within the inner tubular member 74 on FIG. 5 has been removed from the inner tubular member 74. In certain embodiments, the screen 76 is inserted into the upper end of the inner tubular member 74 before the spray nozzle 60 is screwed over the same. In certain embodiments, the tip of a small flat-headed screwdriver (not illustrated) may be inserted in a keyway or slot 86 (FIG. 7) in an upper end of a screw 84 (FIG. 8) to raise and lower the head of the screw 84 relative to a shoulder of the screen 76 to constrict flow and thereby adjust the radius of the sprinkler 60. In certain embodiments, the screen 76 has a generally cylindrical configuration with a flared upper end 79 that rests on the upper end of the inner tubular member 74 and a lower perforated tubular portion that filters sediment, grit and other debris to prevent it from clogging the one or more orifices 66 of the nozzle 60. In certain embodiments, the screen 76 is injection-molded. As shown in FIG. 6, the inner tubular member 74 can have threads 78 configured to engage the threads 68 in the nozzle 60.

Figure 7:
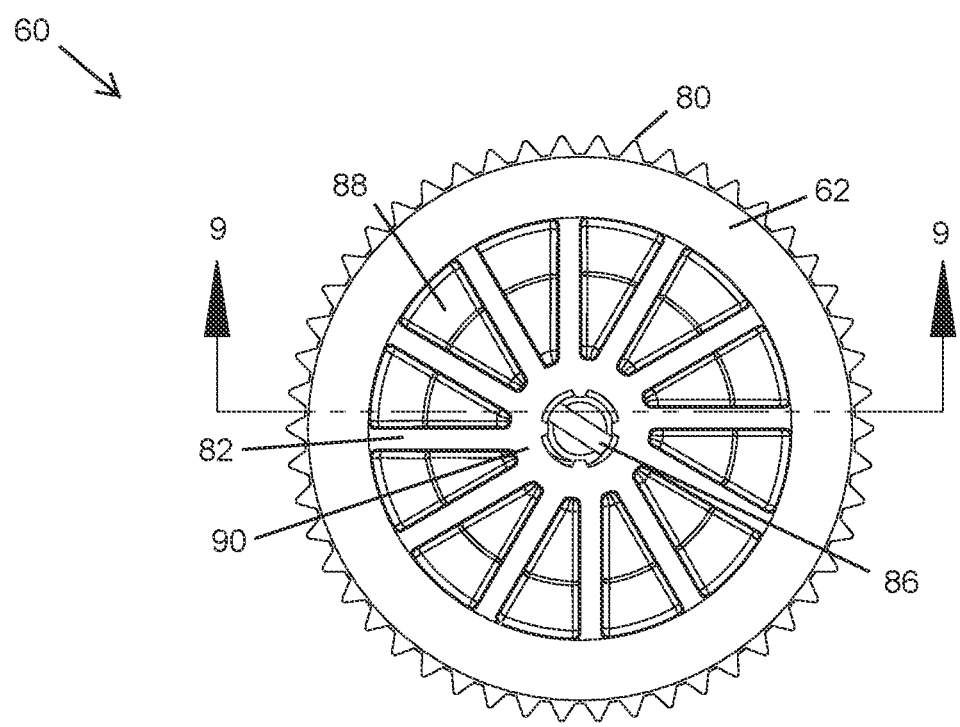
FIG. 7 is a top plan view of the adjustable spray nozzle of FIG. 1.
Figure 8:
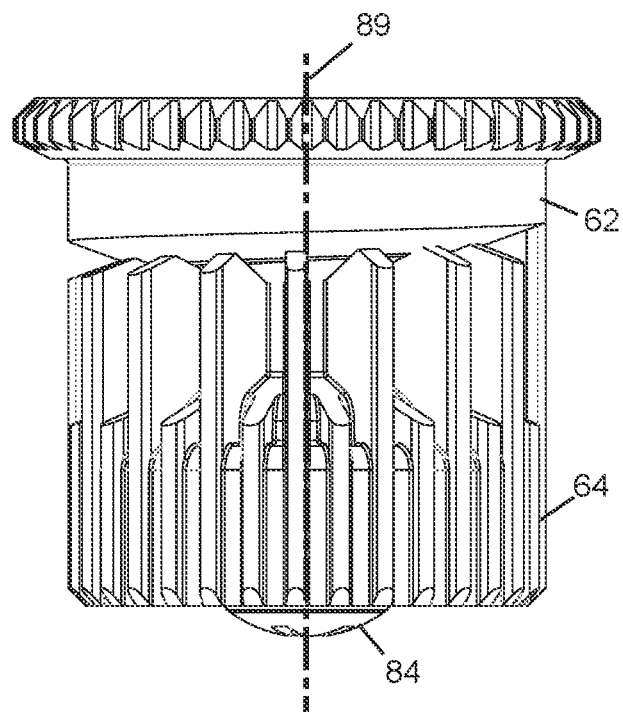
FIG. 8 is a side view of the adjustable spray nozzle of FIG. 1.

FIG. 7 is a top plan view of the adjustable spray nozzle 60 of FIG. 1. FIG. 8 is a side view of the adjustable spray nozzle 60 of FIG. 1. In the illustrated embodiment, the upper member 62 has a knurled segment 80 that facilitates gripping between the thumb and index finger. In certain embodiments, the upper member 62 is rotatable relative to the lower member 64 about a central axis 89 to select the desired arc size of the water spray pattern when water from the inner tubular member 74 travels through the flow path 65 and is ejected from the exit 61. In certain embodiments, the spray nozzle 60 includes a central sleeve 95 (FIG. 9) through which the screw 84 is threaded. The screw 84 extends at least partially through the spray nozzle 60 with the keyway or slot 86 being accessible from the top of the spray nozzle 60.

In certain embodiments, the upper member 62 includes one or more webs 82 connecting the knurled segment 80 to a central region 90 of the upper member 62. In certain embodiments, the one or more webs 82 can be sized and shaped to transfer rotational motion between the knurled segment 80 and the central region 90 of the upper member 62. In certain embodiments, one or more pockets 88 are formed between the one or more webs 82 and partially defined by sides of each of the one or more webs 82. In certain embodiments, the one or more pockets 88 can reduce the overall mass of the upper member 62 while allowing torque to transfer via the one or more webs 82 to the central region 90.

FIG. 9 is a cross-section view of the adjustable spray nozzle 60 of FIG. 1 taken along line 9-9 in FIG. 7 and shows the upper member 62 rotatably coupled to the lower member 64. A right half of FIG. 9 illustrates the upper member 62 and the lower member 64 together defining the flow path 65 through the spray nozzle 60 and to the exit 61 in the arc region. In the illustrated embodiment, portions of the flow path 65 are defined by both the upper member 62 and the lower member 64. In certain embodiments, the flow path 65 comprises one or more orifices 66 arranged in series along the flow path 65 and upstream of the exit 61.

A left half of FIG. 9 illustrates the upper member 62 and the lower member 64 together closing the flow path 65 through the spray nozzle 60 and to the exit 61 outside the arc region. In this way, the flow path 65 through the spray nozzle 60 can be opened or closed from 0 to 360 degrees.

In certain embodiments, a manifold 98 formed between orifices 66 along the flow path 65 and between the upper member 62 and the lower member 64 is configured to enhance a distribution of water in the arc region by providing a smooth spray pattern for nozzles 60 configured for short ranges. More specifically, as further explained below, in certain embodiments, the upstream orifice 94 in combination with the manifold 98 reduce the energy of the water passing through the manifold 98. In certain embodiments, the reduction in energy of the water can improve the performance of nozzles 60. In certain embodiments, the reduction in energy caused by the upstream orifice 94 in combination with the manifold 98 creates a more consistent spray pattern.

In certain embodiments, water passes through the filter 76 (FIG. 6) and enters a passage 91 in the nozzle 60. In the illustrated embodiment, the passage 91 is located near the start of the flow path 65. In certain embodiments, the lower member 64 includes the central sleeve 95 through which the screw 84 is threaded. One or more apertures 92 in the central sleeve 95 allow water from the passage 91 to flow through a central hole 93 within the lower member 64. In certain embodiments, the central hole 93 extends through the lower member 64 and the upper member 62. In the illustrated embodiment, the upper member 62 is screwed over the threaded shank of the screw 84.

FIG. 10 is an enlarged view of a portion of FIG. 9 taken in the arc region and showing a water flow path that includes an upstream orifice 94 and a downstream orifice 96 located downstream of the upstream orifice 94. In certain embodiments, the flow path 65 downstream of the central hole 93 comprises the upstream orifice 94 and the downstream orifice 96. In certain embodiments, the downstream orifice 96 is a primary orifice. In certain embodiments, the upstream orifice 94 can be formed between portions of the upper member 62 and the lower member 64. In the illustrated embodiment, a first mating surface 99 on the lower member 64 and a second mating surface 101 on the upper member 62 together form the upstream orifice 94. In some embodiments, the first mating surface 99 and the second mating surface 101 can be smooth. In this way, a first gap 103 is defined between the first mating surface 99 and the second mating surface 101 and in the flow path 65. In certain embodiments, the first gap 103 is a minimum distance between the first mating surface 99 and the second mating surface 101. In certain embodiments, the first gap 103 extends for the length of the arc opening for the adjustable spray nozzle 60. In some embodiments. the first mating surface 99 or the second mating surface 101 can be textured. In some embodiments, the first mating surface 99 or the second mating surface 101 can include ribs. In some embodiments, the first gap 103 may be segmented.

Similarly, the downstream orifice 96 can be formed between portions of the upper member 62 and the lower member 64. In the illustrated embodiment, a first mating surface 100 on the lower member 64 and a second mating surface 102 on the upper member 62 together form the downstream orifice 96. In this way, a second gap 105 is defined between the first mating surface 100 and the second mating surface 102 in the flow path 65. In certain embodiments, the second gap 105 is a minimum distance between the first mating surface 100 and the second mating surface 102. In certain embodiments, the second gap 105 extends for the length of the arc opening for the adjustable spray nozzle 60. Outside of the arc opening, the first mating surface 100 is disposed in a recess 106 in the upper member 62 closing the second gap 105 and the downstream orifice 96 (left half of FIG. 9).

In certain other embodiments, the second gap 105 between the first mating surface 100 and the second mating surface 102 varies in width along at least a portion of the length of the arc opening. For example, as is illustrated in FIGS. 36-46, the second gap 105 has a variable width for the entire length of the arc opening. In certain embodiments, the second gap 105 has a first width at a first location within the arc opening and a second width at a second location within the arc opening. Of course, the second gap 105 can have more than two widths within the arc opening. For example, the second gap 105 can have an infinite number of different widths within the arc opening. In certain embodiments, the first gap 103 between the first mating surface 99 and the second mating surface 101 varies in width along at least a portion of the length of the arc opening. In certain embodiments, the first gap 103 can vary in a way similar to the second gap 105.

In certain embodiments, the first gap 103 is greater than the second gap 105. In other embodiments, the first gap 103 is less than the second gap 105. In other embodiments, the first gap 103 is the same as the second gap 105.

In certain embodiments, along the flow path 65 and between the upstream orifice 94 and the downstream orifice 96 is the manifold 98. Water flow exiting the upstream orifice 94 enters the manifold 98. In certain embodiments, the manifold 98 forms a third gap 107 between the upper member 62 and the lower member 64 in the flow path 65. In certain embodiments, the third gap 107 extends in the flow path 65 to define a volume of the manifold 98. In certain embodiments, the volume of the manifold 98 is measured from the first gap 103 to the second gap 105. In certain embodiments, the third gap 107 is greater than the first gap 103 and the second gap 105.

In certain embodiments, the third gap 107 of the manifold 98 is sized significantly greater than the first gap 103 to cause a sudden expansion and drop in the pressure of the water entering the manifold 98. In certain embodiments, the change in area from the first gap 103 to the third gap 107 is abrupt to cause turbulence in the flow of water entering the manifold 98. In certain embodiments, the pressure drop across the sudden expansion into the manifold 98 is primarily caused by turbulence mixing in the manifold 98. In certain embodiments, the sudden expansion due to the area change between the first gap 103 and the third gap 107 within the manifold 98 results in a loss of mechanical energy. In certain embodiments, this loss of mechanical energy causes a reduction in flow through the manifold 98 along the flow path 65. In certain embodiments, by reducing the energy in the flow of water entering the downstream orifice 96 from the manifold 98, the energy in the flow of water exiting the downstream orifice 96 is also reduced. In certain embodiments, this reduction in the energy of the water exiting the downstream orifice 96 provides a smoother spray pattern for short range nozzles 60 than could be obtained if the energy level was not reduced.

In certain embodiments, by reducing the energy of the water passing through the manifold 98, the pressure and velocity of the water passing through the downstream orifice 96 is also reduced. In certain embodiments, this reduction in pressure and velocity upstream of the downstream orifice 96 allows the nozzle 60 to employ a larger downstream orifice 96 resulting in a smooth spray pattern for a short range nozzle 60. In some embodiments, the nozzle 60 can have more than two orifices or more than two manifolds. In certain embodiments, the nozzle 60 is configured as a short range nozzle when the nozzle 60 has a range up to 5 feet. In certain embodiments, the nozzle 60 is configured as a short range nozzle when the nozzle 60 has a range up to 8 feet. In certain embodiments, the nozzle 60 is configured as a short range nozzle (FIGS. 1-18) when the nozzle 60 has a range up to 12 feet. Such a reduction in flow energy occurring upstream of the downstream orifice 96 may be undesirable for nozzles 60 configured as long range nozzles (FIGS. 19-44).

Figure 11:
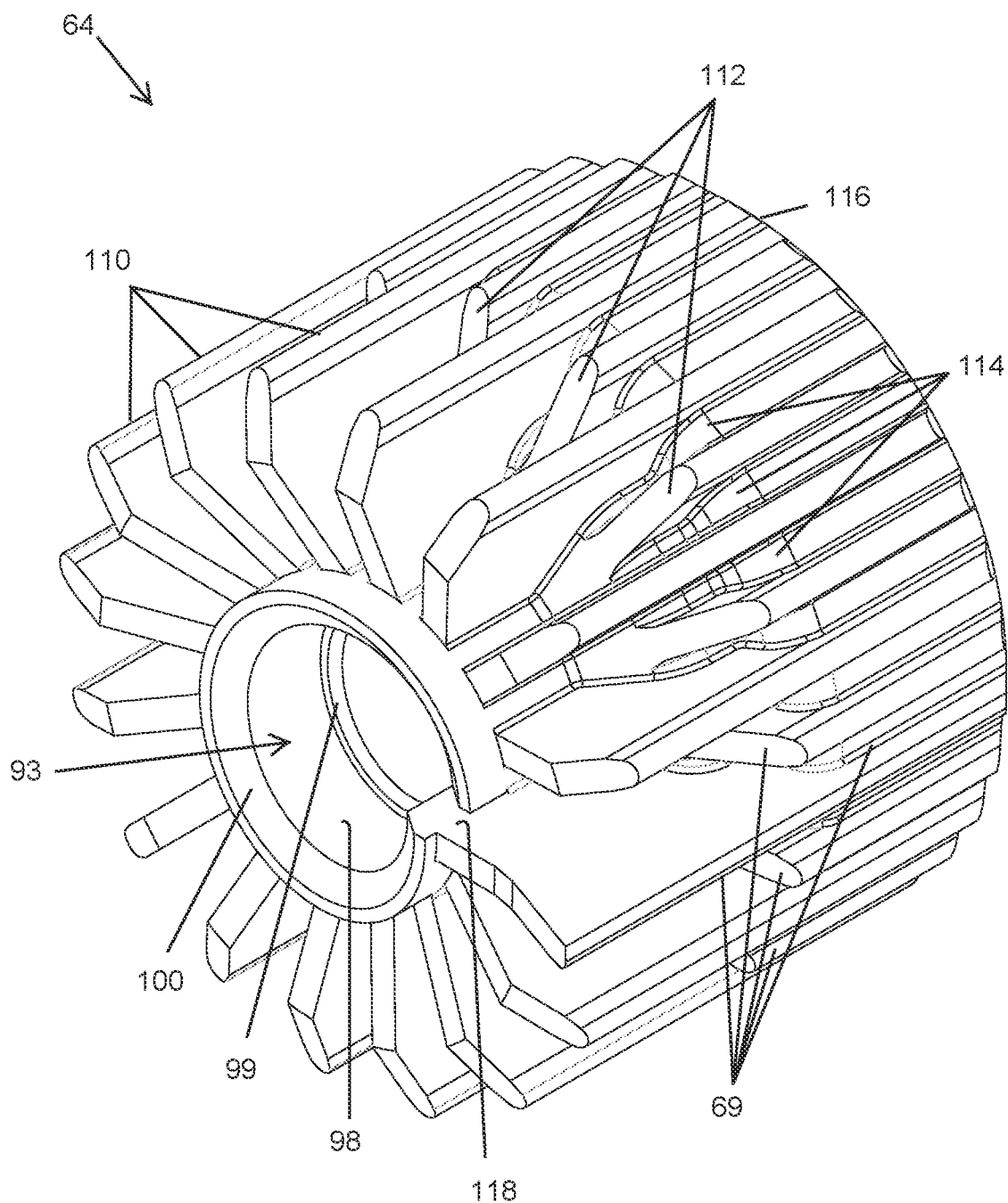
FIG. 11 is a perspective view of the lower member from the adjustable spray nozzle of FIG. 1 showing the first mating surface of the downstream orifice.
Figure 11A:
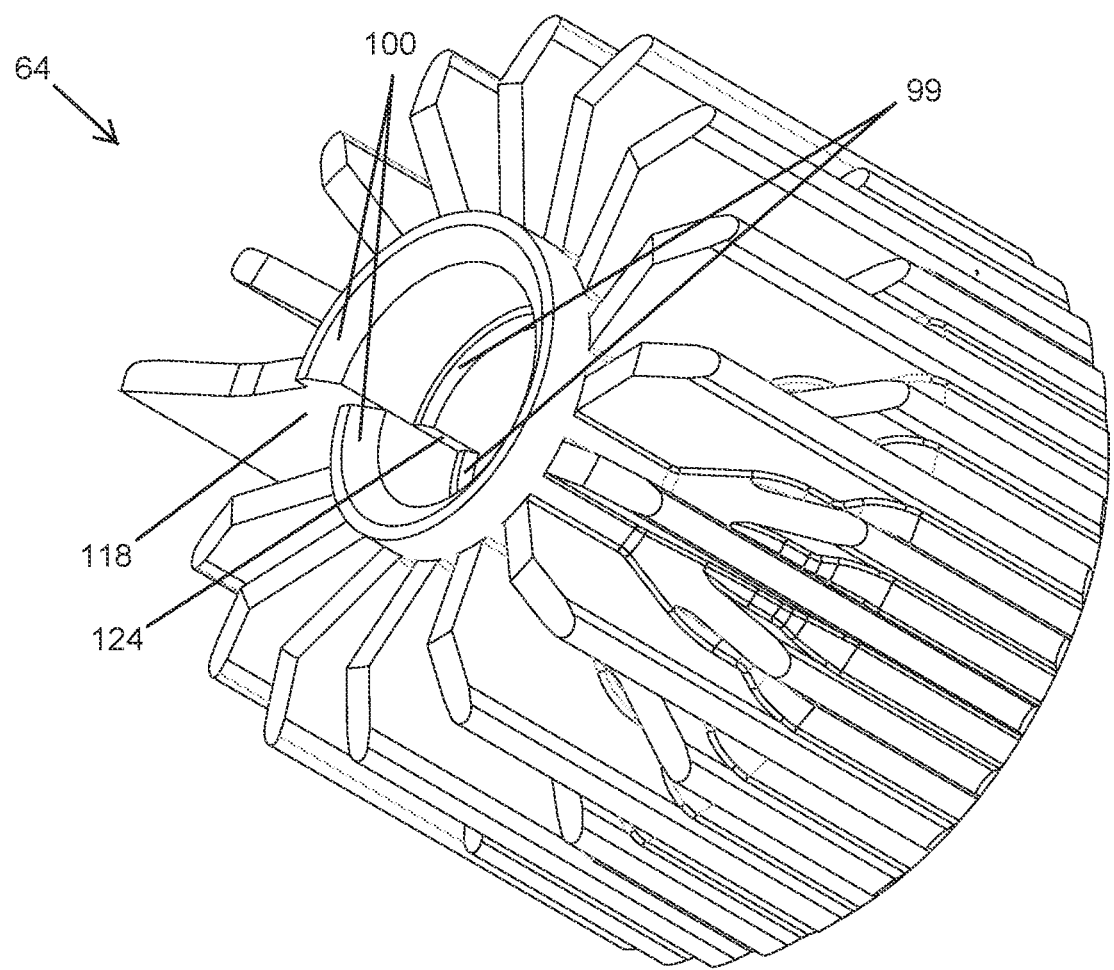
FIG. 11A is another perspective view of the lower member from the adjustable spray nozzle of FIG. 1 showing the first mating surface of the upstream orifice.

FIG. 11 is a perspective view of the lower member 64 from the adjustable spray nozzle 60 of FIG. 1 showing the first mating surface 100 of the downstream orifice 96. FIG. 11A is another perspective view of the lower member 64 from the adjustable spray nozzle 60 of FIG. 1 showing the first mating surface 99 of the upstream orifice 94. In certain embodiments, the first mating surfaces 99, 100 have a helical shape relative to the central hole 93. In certain embodiments, each of the first mating surfaces 99, 100 follows a helical shape from a low point to a high point relative to a bottom surface 116 along each of the first mating surfaces 99, 100. In the illustrated embodiment, the first mating surfaces 99, 100 have a generally planar shape. Of course, the first mating surfaces 99, 100 can have a shape that is not a planar shape. For example, in certain embodiments, the first mating surfaces 99, 100 have a curved shape, a chamfered shape, a square shape, or a radiused shape.

Figure 15:
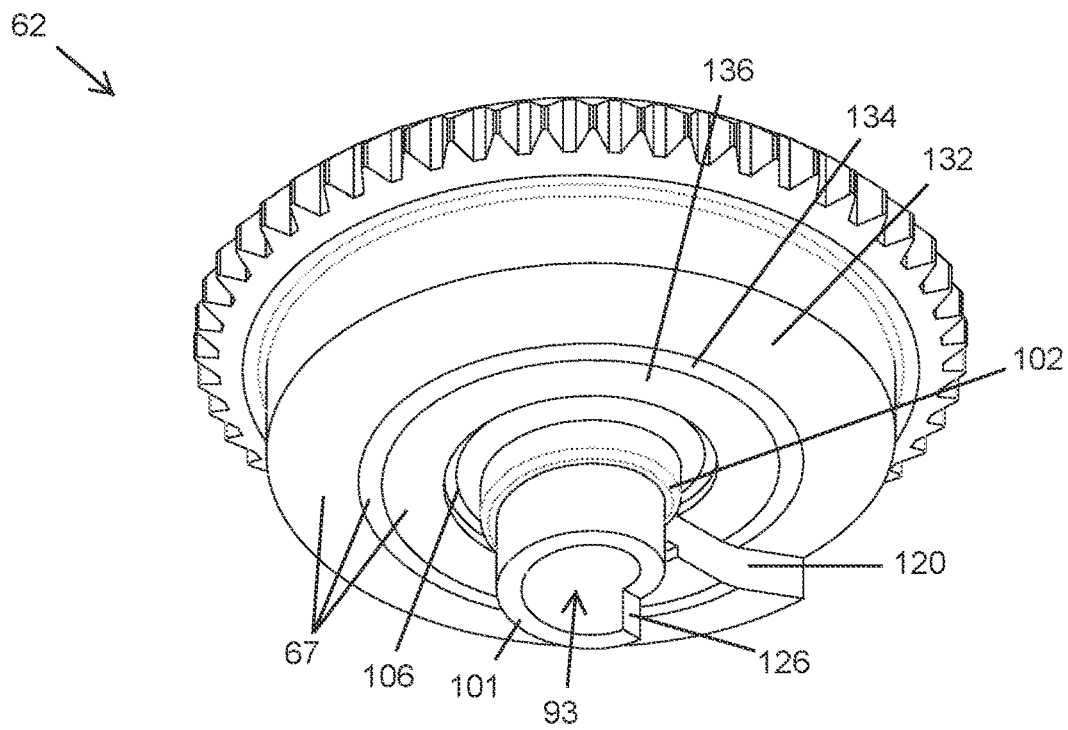
FIG. 15 is a bottom perspective view of the upper member of FIG. 14 showing a first mating surface of the upstream orifice and a first mating surface of the downstream orifice.

The spray nozzle 60 can comprise one or more pairs of walls (118, 120), (124, 126) (FIGS. 11A and 15). In the illustrated embodiment, the pair of walls 118, 120 are located at the downstream orifice 96 and the pair of walls 124, 126 are located at the upstream orifice 94. When in the fully closed position, one or more of the pairs of walls (118, 120), (124, 126) contact each other to prevent water from flowing through the spray nozzle 60. For example, in embodiments which include the pair of walls 124, 126, the pair of walls 124, 126 close the arc opening at a location of the upstream orifice 94. Similarly, in embodiments which include the pair of walls 118, 120, the pair of walls 118, 120 close the arc opening at a location of the downstream orifice 96. In certain embodiments, only one of the pairs of walls (118, 120) or (124, 126) contact each other to close the arc opening. In the illustrated embodiment, two pairs of walls (118, 120) and (124, 126) contact each other to close the arc opening along the flow path 65 at locations above and below the manifold 98.

In certain embodiments, the lower member 64 comprises the wall 118 at the high point of the first mating surface 100. In the illustrated embodiment, the wall 118 is arrange in a vertical direction. In other embodiments, the wall 118 is not arranged in a vertical direction. In certain embodiments, the wall 118 is configured to contact the wall 120 on the upper member 62 (FIG. 15) when the spray nozzle 60 is fully closed or when the arc opening is zero. In certain embodiments, water is prevented from exiting the spray nozzle 60 when in the fully closed position by contact between the walls 118, 120. In certain embodiments, as the upper member 62 is slowly rotated in a counterclockwise direction relative to the lower member 64, the wall 120 slowly moves away from the wall 118 along the helical path of the downstream orifice 96 opening the downstream opening 96 therebetween allowing water to exit the spray nozzle 60 in the arc opening.

In certain embodiments, the lower member 64 comprises the wall 124 at the high point of the first mating surface 99. In the illustrated embodiment, the wall 124 is arrange in a vertical direction. In other embodiments, the wall 124 is not arranged in a vertical direction. In certain embodiments, the wall 124 is configured to contact the wall 126 on the upper member 62 (FIG. 15) when the spray nozzle 60 is fully closed or when the arc opening is zero. In certain embodiments, water is prevented from exiting the spray nozzle 60 when in the fully closed position by contact between the walls 124, 126. As the upper member 62 is slowly rotated in a counterclockwise direction relative to the lower member 64, the wall 126 slowly moves away from the wall 124 along the helical path of the upstream orifice 94 opening the upstream orifice 94 therebetween allowing water to exit the spray nozzle 60 in the arc opening.

In the arc opening between the two pairs of walls (118, 120) and (124, 126) both the upstream orifice 94 and the downstream orifice 96 are open forming the first and second gaps 103, 105 to allow water to flow there between and out of the spray nozzle 60.

In certain embodiments, the widths of the first gap 103 and the second gap 105 are fixed within the arc opening when the upper member 62 is manually rotated relative to the lower member 64. In certain embodiments, this allows a user to select a desired size of the arc of the water spray pattern caused by water exiting the downstream orifice 96 without changing the water spray pattern within the arc opening.

Figure 12:
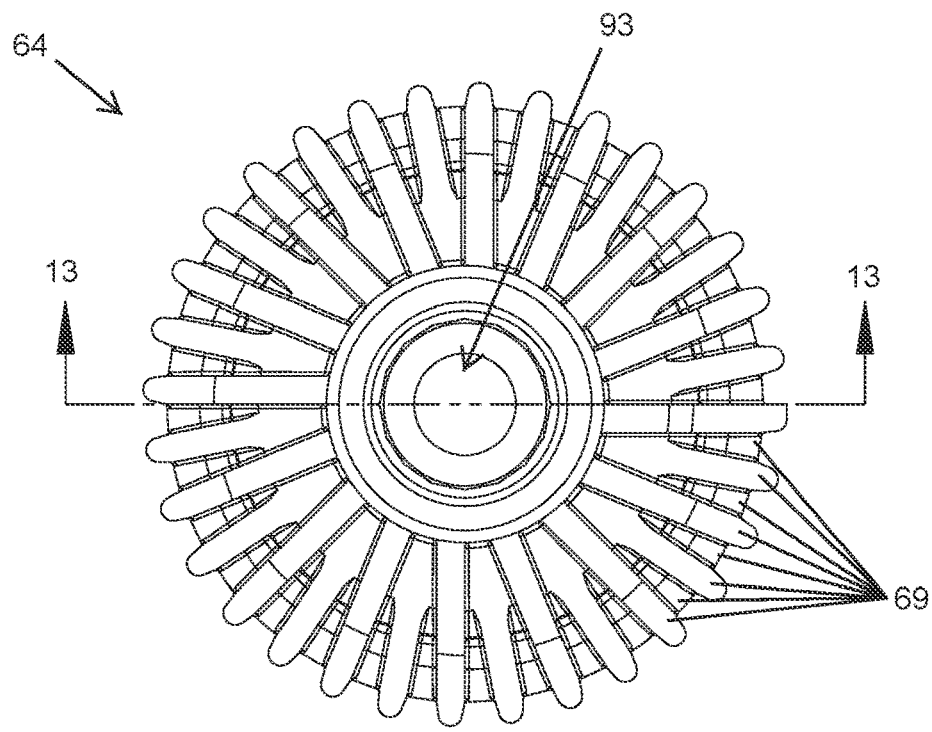
FIG. 12 is a top plan view of the lower member of FIG. 11.
Figure 13:
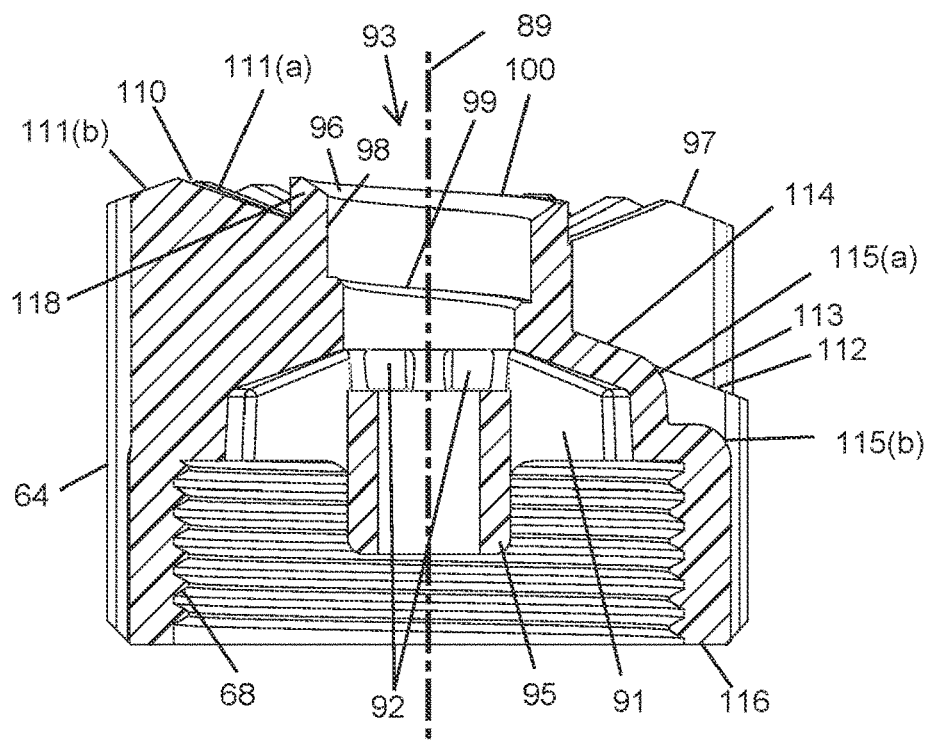
FIG. 13 is a cross-section view of the lower member of FIG. 12 taken along line 13-13 in FIG. 12.

FIG. 12 is a top plan view of the lower member 64 of FIG. 11. The lower member 64 comprises the central hole 93. In certain embodiments, at least a portion of the central hole 93 is sized and shaped to receive the screw 84. FIG. 13 is a cross-section view of the lower member 64 of FIG. 12 taken along line 13-13 in FIG. 12. As is illustrated in FIGS. 11 and 13, a side of the manifold 98 is an inner wall of the lower member 64 between the first mating surfaces 99, 100. In this way, when the lower member 64 is assembled to the upper member 62, the manifold 98 is formed between the upstream orifice 94 and the downstream orifice 96.

In certain embodiments, the exit 61 comprises opposing surfaces of the upper member 62 and the lower member 64 that are downstream of the one or more orifices 66. For example, in certain embodiments, the opposing surface of the upper member 62 comprises the one or more ramps 67 (FIG. 15) and the opposing surface of the lower member 64 comprises the one or more ribs 69 (FIG. 11).

In certain embodiments, the one or more ribs 69 have similar geometry. For example, in certain embodiments, the one or more ribs 69 have the same geometry. In the illustrated embodiment, the one or more ribs 69 include ribs that have different geometry. Exemplary geometric variations can include height (measured from the bottom surface 116), length (measured from the central axis 89), thickness, and orientation relative to the central axis 89. In some embodiments, the lower member 64 can be formed without the one or more ribs 69.

In the illustrated embodiment, the one or more ribs 69 extend in an upward direction from the bottom surface 116 of the lower member 64 to a top surface 97 of the one or more ribs 69 (FIG. 13). The top surfaces 97 of the one or more ribs 69 form the lower opposing surface of the exit 61.

In the illustrated embodiment, the top surfaces 97 of the one or more ribs 69 are located at different heights from the bottom surface 116 and have different contours or profiles. As explained below, in certain embodiments, the geometry of the top surfaces 97 can directly and/or indirectly improve the water spray pattern of the nozzle 60.

In certain embodiments, one or more of the top surfaces 97 can have any shape or a combination of shapes. For example, in certain embodiments, one or more of the top surfaces 97 have a planar shape. For example, in certain embodiments, one or more of the top surfaces 97 have a curvilinear shape. In certain embodiments, one or more of the top surfaces 97 can comprise one or more planar surfaces and one or more curved surfaces. In the illustrated embodiment, some of the one or more top surfaces 97 comprise a planar surface while other top surfaces 97 comprise multiple planar surfaces, with still other top surfaces 97 comprising a combination of planar and curvilinear shapes. In certain embodiments, the one or more ribs 69 include ribs that have top surfaces 97 that are located at different distances from the bottom surface 116 of the lower member 64.

In certain embodiments, the one or more ribs 69 include two, three, four, or five different groups of ribs having top surfaces 97 located at different heights from the bottom surface 116. In the illustrated embodiment, the one or more ribs 69 include three different groups of ribs. In the illustrated embodiment, the three different groups of ribs include one or more high ribs 110, one or more medium ribs 112, and one or more low ribs 114. Of course, in certain embodiments, the one or more ribs 69 can include more or less than the three groups of ribs illustrated in FIG. 11. For example, in certain embodiment, the one or more ribs 69 include only the one or more high ribs 110 and the one or more low ribs 114.

As most clearly shown in FIG. 13, the top surface 97 of the one or more high ribs 110 comprises a first surface 111(a) and a second surface 111(b). In certain embodiments, the first surface 111(a) is planar and disposed at an incline in a direction away from the central axis 89. In certain embodiments, the second surface 111(b) is planar and begins at a distal edge of the first surface 111(a) to form a chamfer at an outer edge of the one or more high ribs 110.

In certain embodiments, the top surface 97 of the one or more medium ribs 112 comprises surface 113. In certain embodiments, the surface 113 is planar and disposed at a decline in a direction away from the central axis 89.

In certain embodiments, the top surface 97 of the one or more low ribs 114 comprises a first surface 115(a) and a second surface 115(b). In certain embodiments, each of the first surface 115(a) and the second surface 115(b) comprises planar and curved portions. In certain embodiments, the planar portion of the first surface 115(a) is disposed at a decline in a direction away from the central axis 89 while the planar portion of the second surface 115(b) is horizontal in a direction away from the central axis 89. In the illustrated embodiment, the surface 113 of the one or more medium ribs 112 is parallel to the planar portion of the first surface 115(a) of the one or more low ribs 114.

In certain embodiments, the one or more ribs 69 extend in a radial direction away from the central axis 89. In certain embodiments, the one or more ribs 69 extend parallel to the direction of water flow exiting the spray nozzle 60. Of course, the one or more ribs 69 need not extend in a radial direction or parallel to the direction of water flow exiting the spray nozzle 60. For example, in certain embodiments, the one or more ribs 69 are canted at an angle relative to the radial direction so as to not be aligned with the central axis 89.

In certain embodiments, the nozzle 60 comprises a plurality of each of the different groups of ribs 110, 112, 114. In the illustrated embodiment, the one or more high ribs 110 include 16 ribs. In the illustrated embodiment, the one or more medium ribs 112 include 16 ribs. In the illustrated embodiment, the one or more low ribs 114 include 32 ribs. Of course, other combinations of the number of high, medium, and low ribs 110, 112, 114 and/or the number of groups of ribs 69 falls within this disclosure.

In certain embodiments, the different groups of ribs 110, 112, 114 are spaced about a perimeter of the lower member 64. For example, in the illustrated embodiment, the one or more high ribs 110 and the one or more medium ribs 112 are interleaved about the perimeter of the lower member 64. In the illustrated embodiment, the one or more low ribs 114 are disposed between each pair of adjacent high and medium ribs 110, 112. In other embodiments, the ribs within each group of ribs 110, 112, 114 are unequally spaced about a perimeter of the lower member 64.

As is illustrated in FIG. 13, the lower member 64 comprises the one or more apertures 92 extending through the sleeve 95. The one or more apertures 92 in the central sleeve 95 allow water from the passage 91 to flow through the central hole 93 within the lower member 64 along the flow path 65.

Figure 14:
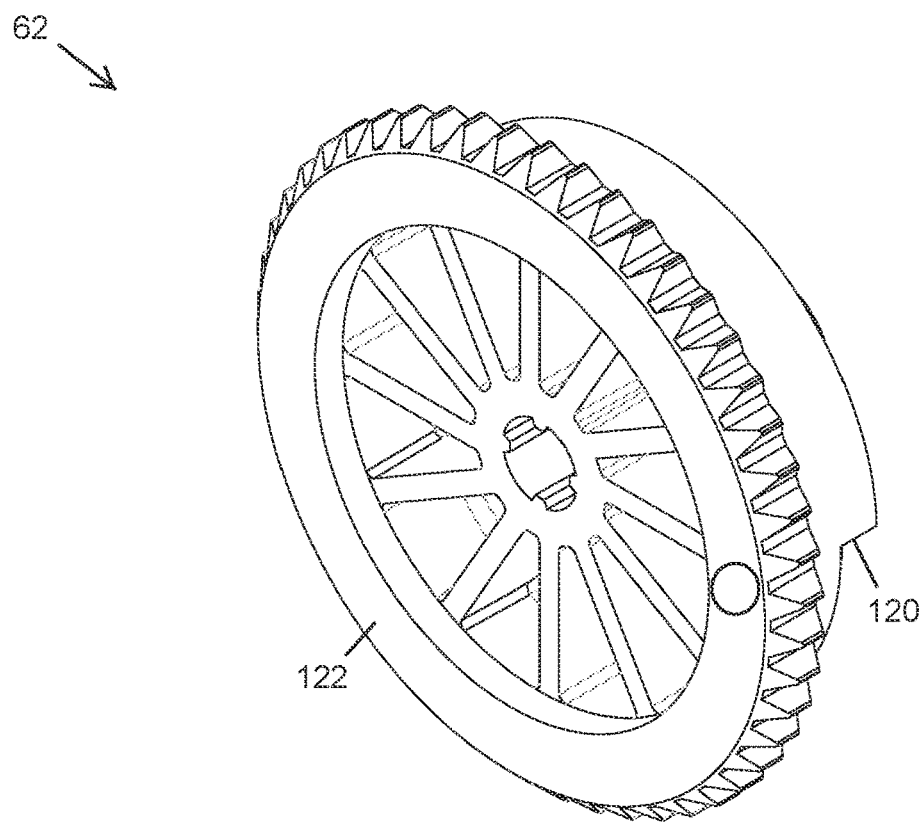
FIG. 14 is a top perspective view of the upper member from the adjustable spray nozzle of FIG. 1.

FIG. 14 is a top perspective view of the upper member 62 from the adjustable spray nozzle 60 of FIG. 1. FIG. 15 is a bottom perspective view of the upper member 62 of FIG. 14 showing the second mating surface 101 of the upstream orifice 94 and the second mating surface 102 of the downstream orifice 96. In certain embodiments, the second mating surfaces 101, 102 have a helical shape relative to the central hole 93. In certain embodiments, each of the second mating surfaces 101, 102 follows the helical shape from a low point to a high point relative to a top surface 122 along each of the second mating surfaces 101, 102. In the illustrated embodiment, the second mating surface 101 is at least partially formed by an edge of the upper member 62. In the illustrated embodiment, the second mating surface 102 has a generally curved shape. Of course, the second mating surfaces 101, 102 can have any shape and are not limited to the illustrated shapes. For example, in certain embodiments, the second mating surfaces 101, 102 both have curved shapes. For example, in certain embodiments, the second mating surfaces 101, 102 both have planar shapes.

In certain embodiments, the upper member 62 comprises the wall 120 at the high point of the second mating surface 102. In the illustrated embodiment, the wall 120 is arrange in a vertical direction. In other embodiments, the wall 120 is not vertical. For example, in certain embodiments, the angle of the wall 120 is complementary to the angle of the wall 118 so that the wall 120 engages with the wall 118 when the spray nozzle 60 is fully closed or when the arc opening is zero.

In certain embodiments, the wall 120 is configured to contact the wall 118 on the lower member 64 (FIG. 11) when the spray nozzle 60 is fully closed or when the arc opening is zero. In certain embodiments, a portion of the wall 120 is configured to contact the first mating surface 100 on the lower member 64 (FIG. 9) when the spray nozzle 60 is fully closed or when the arc opening is zero. In certain embodiments, water is prevented from exiting between the walls 118, 120 of the spray nozzle 60 when in the fully closed position. As the upper member 62 is slowly rotated in a counterclockwise direction relative to the lower member 64, the wall 120 slowly moves away from the wall 118 along the helical path of the downstream orifice 96 opening the downstream opening 96 therebetween allowing water to exit the spray nozzle 60 in the arc opening. In the arc opening, both the upstream orifice 94 and the downstream orifice 96 are spaced from their respective mating surfaces 101, 102 forming the first and second gaps 103, 105 to allow water to flow therebetween.

In certain embodiments, the wall 126 is configured to contact the wall 124 on the lower member 64 (FIG. 11A) when the spray nozzle 60 is fully closed or when the arc opening is zero. In certain embodiments, water is prevented from exiting between the walls 124, 126 of the spray nozzle 60 when in the fully closed position. As the upper member 62 is slowly rotated in a counterclockwise direction relative to the lower member 64, the wall 126 slowly moves away from the wall 124 along the helical path of the upstream orifice 94 opening the upstream opening 94 therebetween allowing water to exit the spray nozzle 60 in the arc opening. In certain embodiments in the arc opening, both the upstream orifice 94 and the downstream orifice 96 are spaced from their respective mating surfaces 101, 102 forming the first and second gaps 103, 105 to allow water to flow there between.

In certain embodiments, the widths of the first gap 103 and the second gap 105 do not vary within the arc opening when the upper member 62 is manually rotated relative to the lower member 64. This allows a user to select a desired size of the arc of the water spray pattern caused by water exiting the downstream orifice 96 without changing the water spray pattern within the arc opening. In certain other embodiments, the second gap 105 varies in width along at least a portion of the length of the arc opening. For example, as is illustrated in FIGS. 36-46, the second gap 105 has a variable width for at least a portion of the length of the arc opening.

In certain embodiments, the opposing surface to the one or more ribs 69 of the lower member 64 (FIG. 11) is the one or more ramps 67 of the upper member 62 (FIG. 15). In the illustrated embodiment, at least a portion of the one or more ramps 67 defines a convex surface. In certain embodiments, the convex surface is a curved surface. In certain embodiments, the curved surface comprises two or more arcs or curves. In certain embodiments, the two or more arcs or curves have different radii. In certain embodiments, the convex surface comprises two or more line segments. In certain embodiments, the two or more lines have different lengths. Of course, the convex surface can be formed from any combination of one or more arcs, curves, or line segments.

In the illustrated embodiment, the convex surface of the one or more ramps 67 comprises three line segments. For example, in the illustrated embodiment, the one or more ramps 67 comprise a radial ramp 132, a mid-level ramp 134, and a head water ramp 136. The one or more ramps 67 are further described with respect to FIGS. 19-30.

Figure 16:
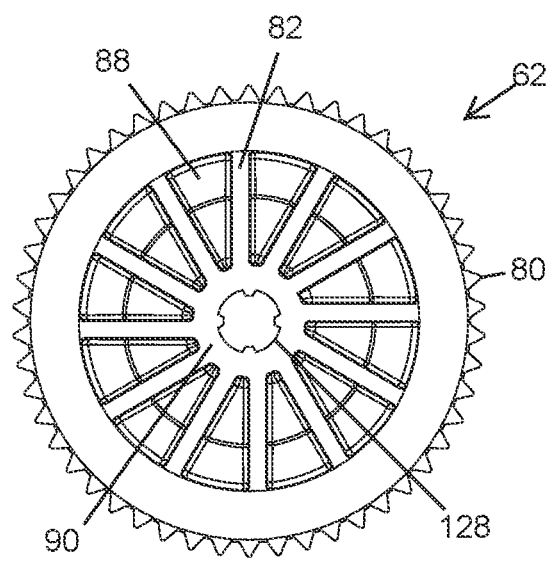
FIG. 16 is a top plan view of the upper member from FIG. 14.

FIG. 16 is a top plan view of the upper member 62 from FIG. 14. In the illustrated embodiment, the upper member 62 has the knurled segment 80. In certain embodiments, the upper member 62 includes the one or more webs 82 connecting the knurled segment 80 to the central region 90 of the upper member 62. The one or more webs 82 can be sized and shaped to transfer rotational motion between the knurled segment 80 and the central region 90 of the upper member 62. In certain embodiments, the one or more pockets 88 are formed between the one or more webs 82 and partially defined by sides of each of the one or more webs 82.

In certain embodiments, the upper member 62 has a central opening 128 in the central region 90. In certain embodiments, the central opening 128 is sized and shaped to receive a portion of the screw 84.

Figure 17:
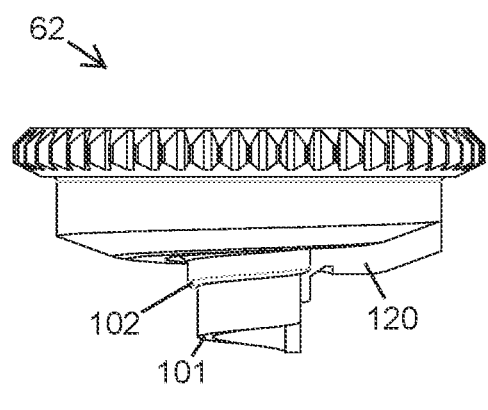
FIG. 17 is a side plan view of the upper member from FIG. 14 in a first rotational position showing the first mating surface of the upstream orifice and the first mating surface of the downstream orifice.

FIG. 17 is a side plan view of the upper member 62 from FIG. 14 in a first rotational position showing the second mating surface 101 of the upstream orifice 94 and the second mating surface 102 of the downstream orifice 96. In certain embodiments, the wall 120 extends in a downward axial direction and into the manifold 98 formed between the upper member 62 and the lower member 64 outside of the arc opening. In certain embodiments, the portion of the wall 120 disposed in the manifold 98 may further inhibit the water from exiting the spray nozzle 60 outside of the arc opening.

Figure 18:
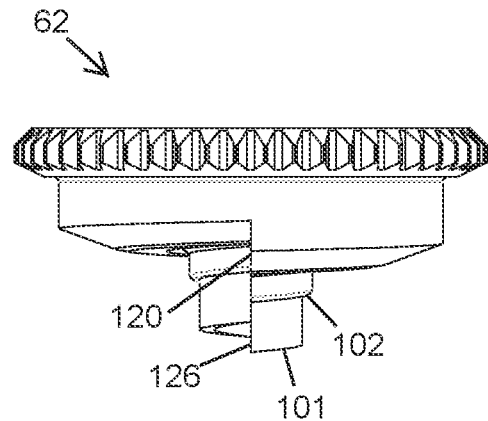
FIG. 18 is similar to FIG. 17 except the upper member has been rotated 90 degrees clockwise to a second rotational position.

FIG. 18 is similar to FIG. 17 except the upper member 62 has been rotated 90 degrees clockwise to a second rotational position. As is illustrated by FIGS. 17 and 18, the wall 120 and the wall 126 are disposed on a common plane. In certain embodiments, the wall 118 and the wall 124 on the lower member 64 are similarly disposed on a common plane (FIG. 12). In this way, in certain embodiments, the walls 120, 126 can simultaneously engage with the walls 118, 124, respectively, when fully closed. Of course, the walls 120, 126 need not share a common plane to simultaneously engage with the walls 118, 124. For example, the walls 118, 124 can be offset from each other the same amount that the walls 120, 126 are offset from each other. In this way the walls 120, 126 can simultaneously engage with the walls 118, 124 along two different planes. In certain embodiments where the walls 118, 120 are located downstream of the walls 124, 126 along the flow path 65, the walls 118, 120 will define the sides of the arc opening for the water exiting the spray nozzle 60.

Figure 19:
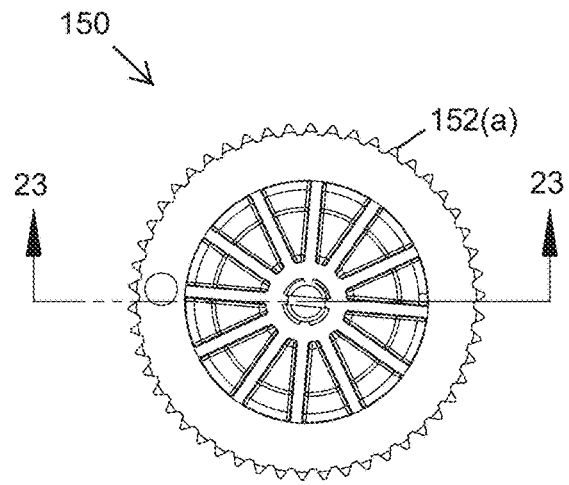
FIG. 19 is a top plan view of an embodiment of an adjustable spray nozzle that includes one or more ramps disposed so as to deflect water flow exiting the downstream orifice to cover both close and far distances from the adjustable spray nozzle.
Figure 20:
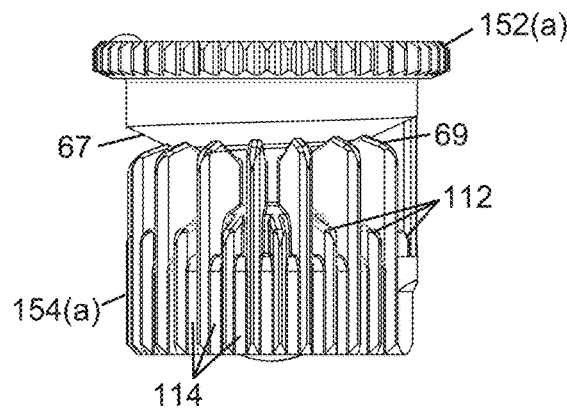
FIG. 20 is a side plan view of the adjustable spray nozzle of FIG. 19.

FIG. 19 is a top plan view of an embodiment of an adjustable spray nozzle 150. FIG. 20 is a side plan view of the adjustable spray nozzle 150 of FIG. 19 that includes the one or more ramps 67 and the one or more ribs 69 of the spray nozzle 60 disposed so as to deflect water exiting the downstream orifice 96 to cover both close and far distances from the spray nozzle 150. The spray nozzle 150 is similar to the spray nozzle 60 (FIGS. 1-19) except, for example, the spray nozzle 150 does not include the upstream orifice 94. By removing the upstream orifice 94 at the entrance to the manifold 98, the energy loss associated with the upstream orifice 94 does not occur. In this way, the water entering the downstream orifice 96 of the nozzle 150 is at a higher energy level than water entering the downstream orifice 96 of the nozzle 60. The higher energy level of the water allows the nozzle 150 to create a longer range spray pattern than the spray pattern created by the nozzle 60. In certain embodiments, the higher energy level of the water allows the nozzle 150 to create a higher flow rate of water than a flow rate created by the nozzle 60.

In certain embodiments, the adjustable spray nozzle 150 includes an upper member 152(*a*) and a lower member 154(*a*). The upper member 152(*a*) is similar to the upper member 62 (FIGS. 1-19) except, for example, the upstream orifice 94 has been removed. Likewise, the lower member 154(*a*) is similar to the lower member 64 (FIGS. 1-19) except, for example, the upstream orifice 94 has been removed. In the illustrated embodiment, the upper member 152(*a*) is rotatable relative to the lower member 154(*b*).

Figure 21:
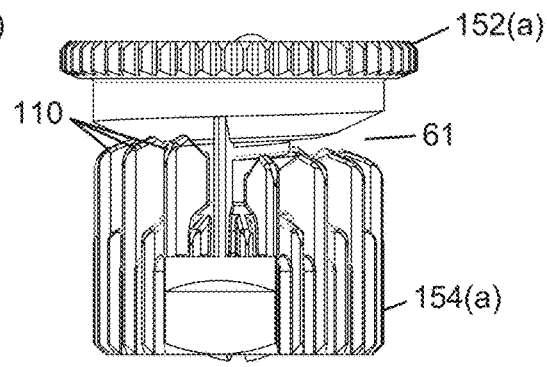
FIG. 21 is another side plan view of the adjustable spray nozzle of FIG. 19.

FIG. 21 is another side plan view of the adjustable spray nozzle 150 of FIG. 19. In addition to the one or more ramps 67, the exit 61 further comprises the one or more ribs 69. In the illustrated embodiment, the one or more ribs 69 include three different groups of ribs. In the illustrated embodiment, the three different groups of ribs include the one or more high ribs 110, the one or more medium ribs 112, and the one or more low ribs 114. Of course, in certain embodiments, the one or more ribs 69 can include more or less than the three groups of ribs illustrated in FIGS. 20 and 21. For example, in certain embodiment, the one or more ribs 69 include only the one or more high ribs 110 and the one or more low ribs 114.

Figure 22:
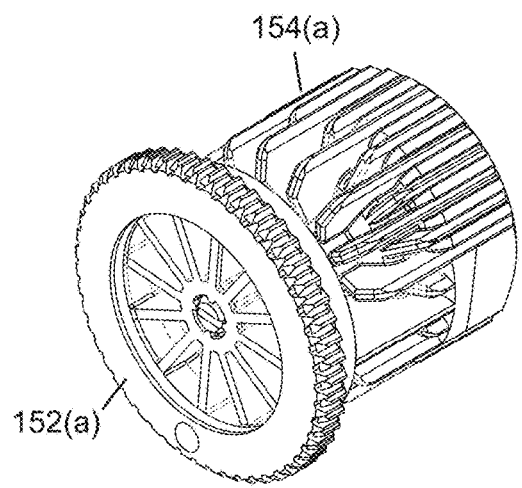
FIG. 22 is a perspective view of the adjustable spray nozzle of FIG. 19.

FIG. 22 is a perspective view of the adjustable spray nozzle 150 of FIG. 19. In certain embodiments, the one or more ramps 67 of the upper member 152(a) defines the spray pattern of the water contacting the ground within the selected size of the arc. In certain embodiments, the one or more ramps 67 of the upper member 152(a) and the one or more ribs 69 of the lower member 154(a) define the spray pattern of the water contacting the ground within the selected size of the arc. In this way, a top surface and a bottom surface of the exit 61 is defined by the one or more ramps 67 and the one or more ribs 69, respectively.

Figure 23:
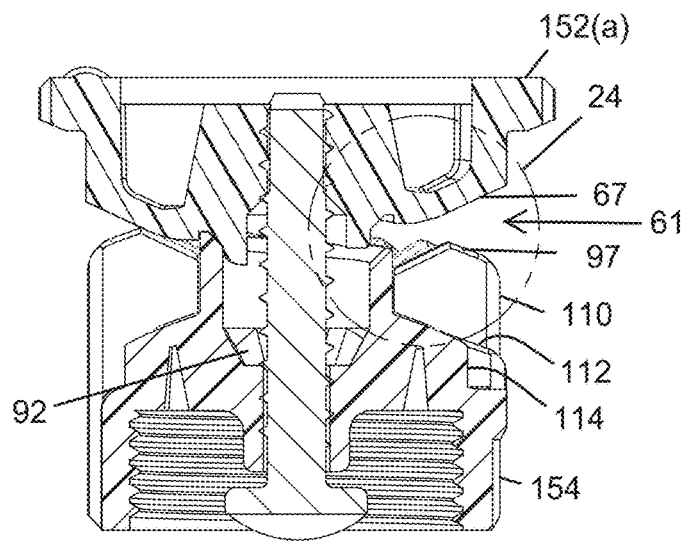
FIG. 23 is a cross-section view of the adjustable spray nozzle of FIG. 19 taken along line 23-23 in FIG. 19.

FIG. 23 is a cross-section view of the adjustable spray nozzle 150 of FIG. 19 taken along line 23-23 in FIG. 19. The upper member 152(a) and the lower member 154(a) together define a flow path 156 (FIG. 24) through the spray nozzle 150 and to the exit 61. In the illustrated embodiment, portions of the flow path 156 are defined by both the upper member 152(a) and the lower member 154(a). As explained above, the flow paths 65, 156 can comprise one or more orifices 66 arranged in series along the flow path 65, 156 and upstream of the exit 61. For example, in the embodiment illustrated in FIGS. 19-44, the flow path 156 comprises the downstream or primary orifice 96 but does not comprise the upstream orifice 94. Of course, the flow paths 65, 156 are not limited to the number or arrangement of the one or more orifices 66. Rotation of the upper member 152(a) relative to the lower member 154(a) adjusts at least a size of an arc of the downstream orifice 96.

Figure 24:
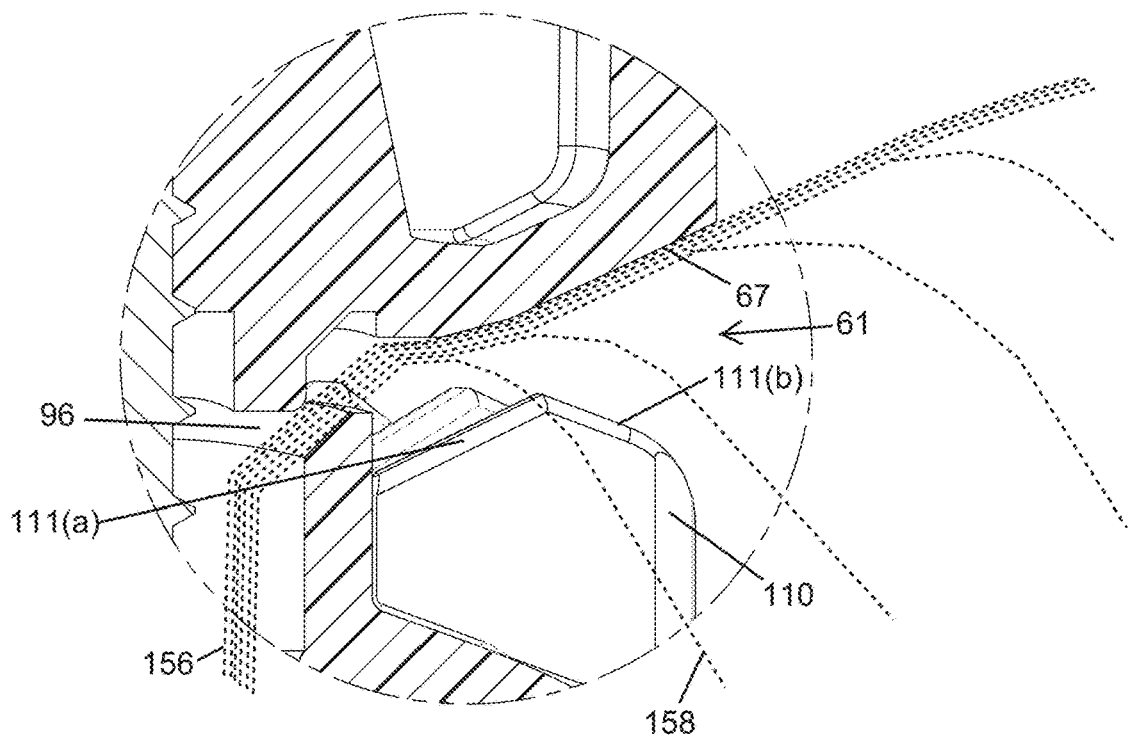
FIG. 24 is an enlarged view of a portion of FIG. 23 showing the water flow exiting the downstream orifice and being deflected by the one or more ramps to cover both close and far distances from the adjustable spray nozzle.

FIG. 24 is an enlarged view of a portion of FIG. 23 showing the water flow exiting the downstream orifice 96 along the flow path 156 and covering both close and far distances from the adjustable spray nozzle 150. In certain embodiments, a headwater portion 158 of the water exiting the spray nozzle 60, 150 flows in a downward direction between the one or more high ribs 110 to provide head water coverage close to the spray nozzle 60, 150. In certain embodiments, the headwater portion 158 exiting the spray nozzle 60, 150 flows in a downward direction over the one or more medium ribs 112 and/or the one or more low ribs 114 to provide head water coverage close to the spray nozzle 60, 150. In certain embodiments, openings between adjacent ribs of the one or more ribs 69 allow the head water to exit the nozzle 60, 150 unblocked. In certain embodiments, the headwater portion 158 flows in a downward direction between the top surfaces 97 of adjacent high ribs 110. For example, in the illustrated embodiment, the headwater portion 158 is illustrated as flowing in a downward direction and at least between the first and second surfaces 111(a), 111(b) of adjacent high ribs 110. In certain embodiments, the one or more ribs 69 provide structural stability to the lower member 64, 154 during assembly with the upper member 62, 152.

In certain embodiments, at least a portion of the water exiting the spray nozzle 60, 150 follows the convex surface of the one or more ramps 67. In certain embodiments, the one or more ramps 67 extend in a radial direction away from the central axis 89. In certain embodiments, the one or more ramps 67 extend parallel to the direction of water flow exiting the spray nozzle 60. Of course, the one or more ramps 67 need not extend in a radial direction or parallel to the direction of water flow exiting the spray nozzle 60.

In certain embodiments, the Coandă effect causes the portion of the water to follow the convex surface of the one or more ramps 67. The Coandă effect is the tendency of a fluid jet to stay attached to a convex surface. In this way, the water exiting from the downstream orifice 96 has a tendency to follow the profile of the one or more ramps 67 and to create a region of lower pressure in the area of the one or more ramps 67 as compared to the higher ambient pressure in the region of the one or more ribs 69. In certain embodiments, portions of the water exiting from the downstream orifice 96 slowly peel off at the different trajectories of the one or more ramps 67 due to the Coandă effect improving the spray pattern. In certain embodiments, the curving of the water exiting from the downstream orifice 96 due to the Coandă effect increases the distance and coverage of the spray pattern.

In the illustrated embodiment, at least a portion of the one or more ramps 67 defines the convex surface. In certain embodiments, the convex surface is a curved surface. In certain embodiments, the curved surface comprises two or more arcs. In certain embodiments, the two or more arcs have different radii. In certain embodiments, the convex surface comprises two or more line segments. In certain embodiments, the two or more lines have different lengths. Of course, the convex surface can be formed from any combination of one or more arcs or line segments to define the one or more ramps 67.

Figure 25:
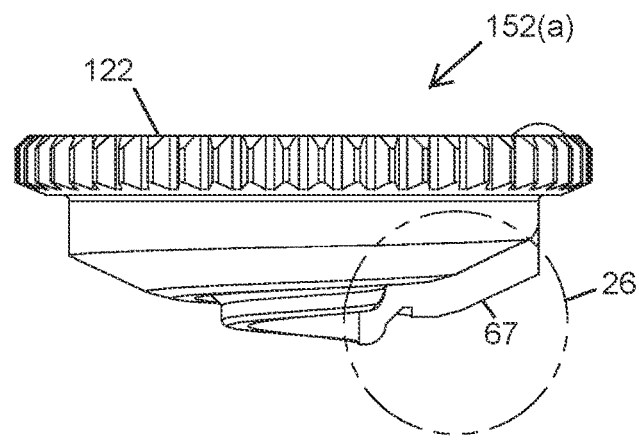
FIG. 25 is a side plan view of the upper member from FIG. 21 rotated 90 degrees counterclockwise relative to FIG. 21 to show a side profile of an embodiment of the one or more ramps of a multi ramp deflector.

FIG. 25 is a side plan view of the upper member 152(a) from FIG. 21 rotated 90 degrees counterclockwise relative to FIG. 21 to show a side profile of an embodiment of the one or more ramps 67 of a multi ramp deflector. In the illustrated embodiment, the convex surface of the one or more ramps 67 comprises at least three line segments. For example, in the illustrated embodiment, the one or more ramps 67 comprise the radial ramp 132, the mid-level ramp 134, and the head water ramp 136.

In the illustrated embodiment, the one or more ramps 67 include ramps that have different geometry. In the illustrated embodiment, the one or more ramps 67 are line segments. As explained above, the one or more ramps 67 can comprise any combination of one or more arcs or line segments to create a convex surface along at least a portion of the one or more ramps 67. For example, the convex surface can be formed along only a small portion of the entire profile of the one or more ramps 67. In other embodiments, the convex surface can be formed for almost the entire profile of the one or more ramps 67. By providing a convex shape for at least a portion of the one or more ramps 67, the spray pattern for the nozzle 60, 150 is improved.

Figure 26:
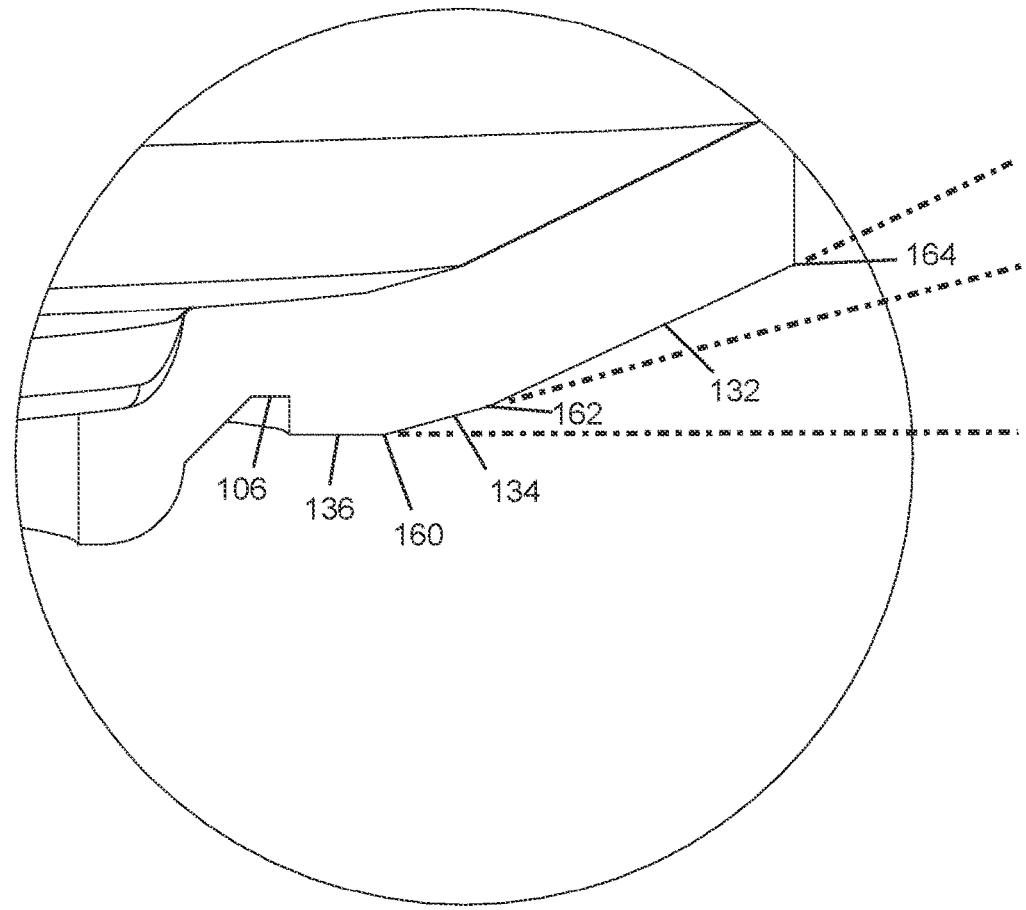
FIG. 26 is an enlarged view of a portion of FIG. 25 showing a radial ramp, a mid-level ramp, and a head water ramp of the multi ramp deflector in FIG. 25.

FIG. 26 is an enlarged view of a portion of FIG. 25 showing the radial ramp 132, the mid-level ramp 134, and the head water ramp 136 of the multi ramp deflector in FIG. 25. In certain embodiments, exemplary geometric variations can include angles, radii, curvature, and lengths. In the illustrated embodiment, the profile of at least some ramps of the one or more ramps 67 extend in an upward direction away from the one or more ribs 69. In the illustrated embodiment, the head water ramp 136 extends in a horizontal direction from the recess 106 to an end point 160. The mid-level ramp 134 begins at the end point 160 and extends in a slightly upward direction to an end point 162. The radial ramp 132 begins at the end point 162 and extends in a slightly more upward direction to an end point 164.

In certain embodiments, the radial ramp 132 is configured to distribute a portion of the water from about 5 to 8 feet from the sprinkler 70. The radial ramp 132 can be configured to distribute a portion of the water from about 8 to 18 feet, from about 2 to 20 feet, and/or further than 20 feet from the sprinkler 70. Many variations are possible.

In certain embodiments, the mid-level ramp 134 is configured to distribute a portion of the water from about 2 to 65 feet from the sprinkler 70. The mid-level ramp 134 can be configured to distribute a portion of the water within about 8 feet, within about 10 feet, within about 15 feet, and/or further than 15 feet from the sprinkler 70. Many variations are possible.

In certain embodiments, the head water ramp 136 is configured to distribute a portion of the water from about 0 to 3 feet from the sprinkler 70. The head water ramp 136 can be configured to distribute a portion of the water within about 5 feet, within about 7 feet, within about 10 feet, and/or further than 10 feet from the sprinkler 70. Many variations are possible.

Figure 27:
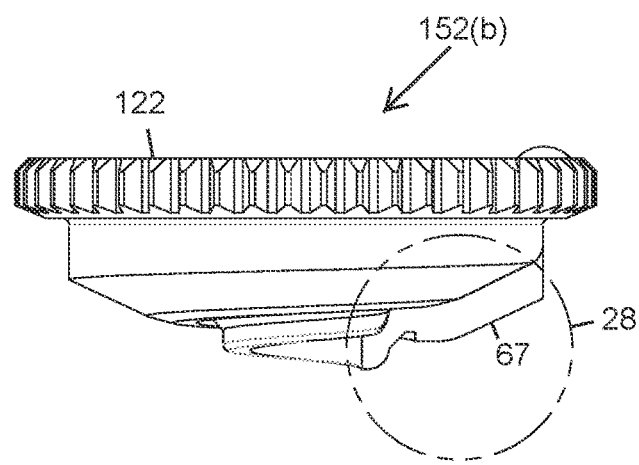
FIG. 27 is a side plan view of an upper member that is similar to the upper member from FIG. 25 except the upper member in FIG. 27 has a different profile for the one or more ramps.

FIG. 27 is a side plan view of an upper member 152(b) that is similar to the upper member 152(a) from FIG. 25 except the upper member 152(b) has a different profile for the one or more ramps 67. In the illustrated embodiment, the convex surface of the one or more ramps 67 comprises at least two line segments and one arc. For example, in the illustrated embodiment, the one or more ramps 67 comprise the radial ramp 132, a curved mid-level ramp 166, and the head water ramp 136.

Figure 28:
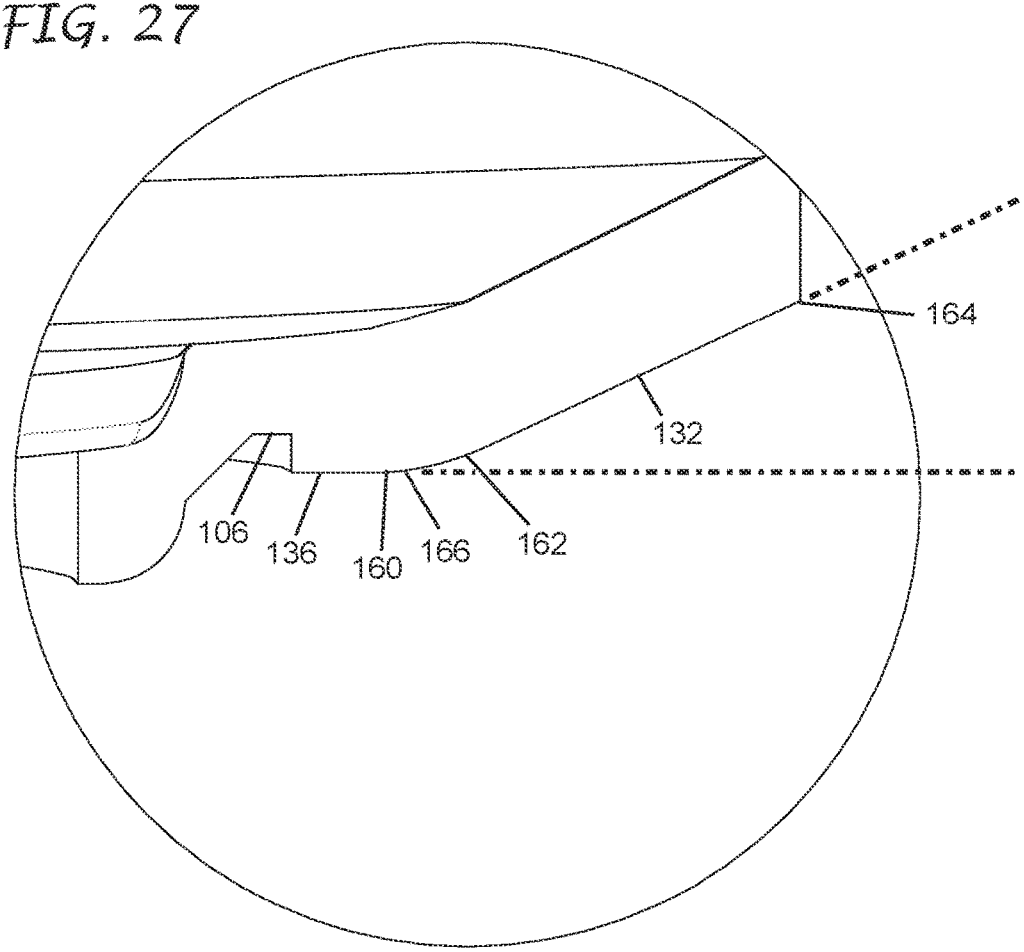
FIG. 28 is an enlarged view of a portion of FIG. 27 showing the radial ramp and the head water ramp connected by a curved mid-level ramp.

FIG. 28 is an enlarged view of a portion of FIG. 27 showing the radial ramp 132 and the head water ramp 136 connected by the curved mid-level ramp 166. The curved mid-level ramp 166 forms a transition between the radial ramp 132 and the head water ramp 136 of the multi ramp deflector in FIG. 27. In the illustrated embodiment, the profile of at least some ramps of the one or more ramps 67 extend in an upward direction away from the one or more ribs 69. In the illustrated embodiment, the head water ramp 136 extends in a horizontal direction from the recess 106 to an end point 160. In certain embodiments, the curved mid-level ramp 166 begins at the end point 160 and curves in an upward direction to an end point 162. In certain embodiments, the radial ramp 132 begins at the end point 162 and extends in a slightly more upward direction to an end point 164.

In certain embodiments, the mid-level ramp 166 is configured to distribute a portion of the water from about 10 to 20 feet from the sprinkler 70. In certain embodiments, the mid-level ramp 166 can be configured to distribute a portion of the water within about 1 foot, within about 5 feet, within about 8 feet, and/or further than 8 feet from the sprinkler 70. Many variations are possible.

Figure 29:
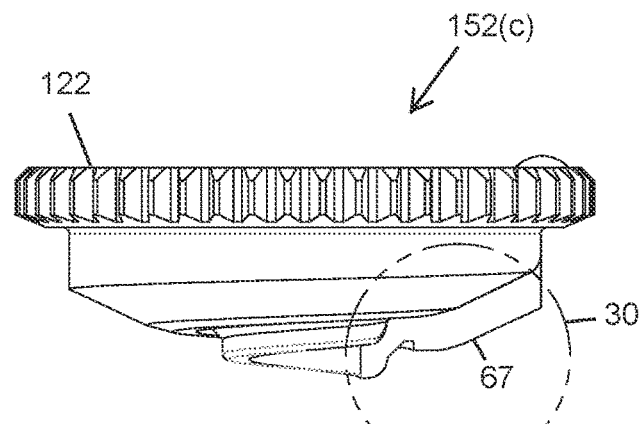
FIG. 29 is a side plan view of an upper member that is similar to the upper member from FIG. 25 except the upper member in FIG. 29 has a different profile for the one or more ramps.

FIG. 29 is a side plan view of an upper member 152(c) that is similar to the upper member 152(a) from FIG. 25 except the upper member 152(c) has a different profile for the one or more ramps 67. In the illustrated embodiment, the convex surface of the one or more ramps 67 comprises at least four line segments. For example, in the illustrated embodiment, the one or more ramps 67 comprise the radial ramp 132, a first mid-level ramp 168, a second mid-level ramp 170, and the head water ramp 136.

Figure 30:
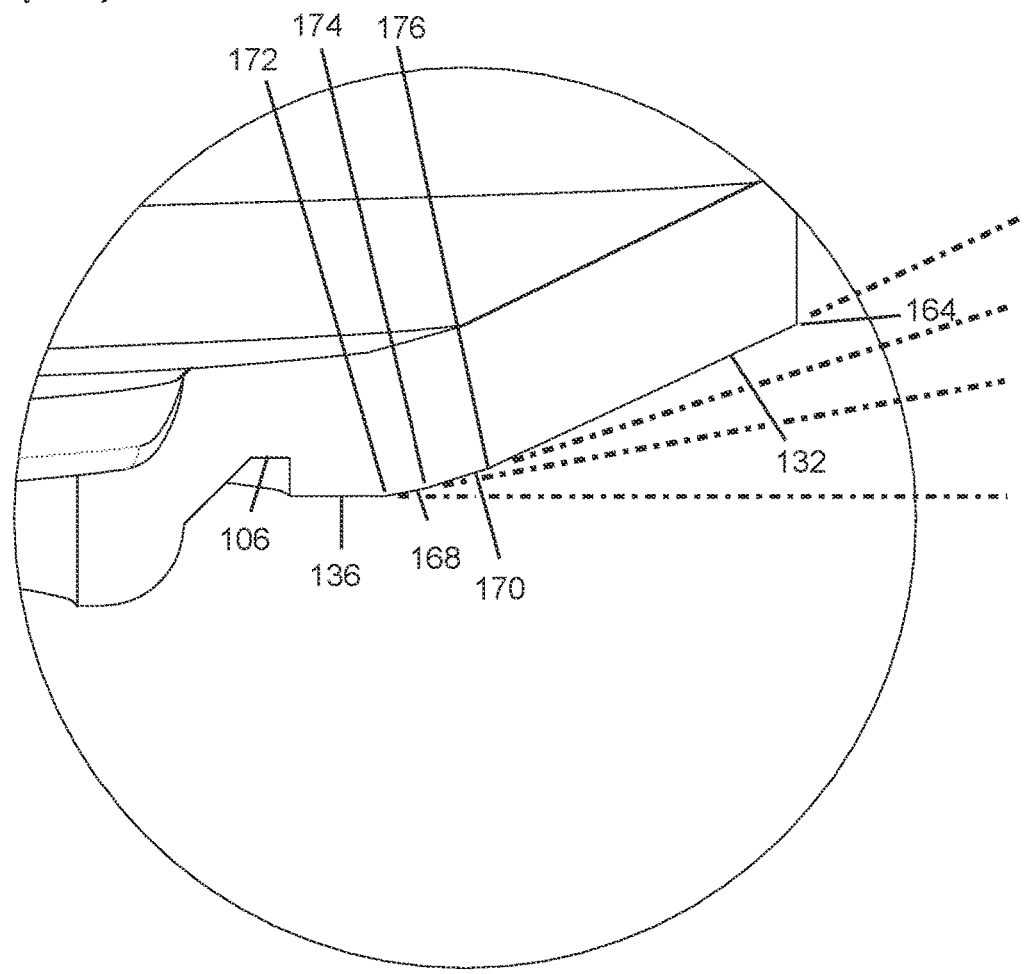
FIG. 30 is an enlarged view of a portion of FIG. 29 showing the radial ramp and the head water ramp connected by a first mid-level ramp in series with a second mid-level ramp.

FIG. 30 is an enlarged view of a portion of FIG. 29 showing the radial ramp 132 and the head water ramp 136 connected by the first mid-level ramp 168 in series with the second mid-level ramp 170. In certain embodiments, the first mid-level ramp 168 and the second mid-level ramp 170 together form a transition between the radial ramp 132 and the head water ramp 139 of the multi ramp deflector in FIG. 29. In the illustrated embodiment, the profile of at least some ramps of the one or more ramps 67 extend in an upward direction away from the one or more ribs 69. In the illustrated embodiment, the head water ramp 136 extends in a horizontal direction from the recess 106 to an end point 172. In certain embodiments, the first mid-level ramp 168 begins at the end point 172 and extends in a slightly upward direction to an end point 174. In certain embodiments, the second mid-level ramp 170 begins at the end point 174 and extends in a slightly upward direction to an end point 176. In certain embodiments, the radial ramp 132 begins at the end point 176 and extends in a slightly more upward direction to an end point 164.

In certain embodiments, the first mid-level ramp 168 is configured to distribute a portion of the water from about 0 to 2 feet from the sprinkler 70. In certain embodiments, the first mid-level ramp 168 can be configured to distribute a portion of the water within about 5 feet, within about 8 feet, and/or further than 8 feet from the sprinkler 70. Many variations are possible.

In certain embodiments, the second mid-level ramp 170 is configured to distribute a portion of the water from about 2 to 5 feet from the sprinkler 70. In certain embodiments, the second mid-level ramp 170 can be configured to distribute a portion of the water within about 8 feet, within about 10 feet, and/or further than 10 feet from the sprinkler 70. Many variations are possible.

Figure 31:
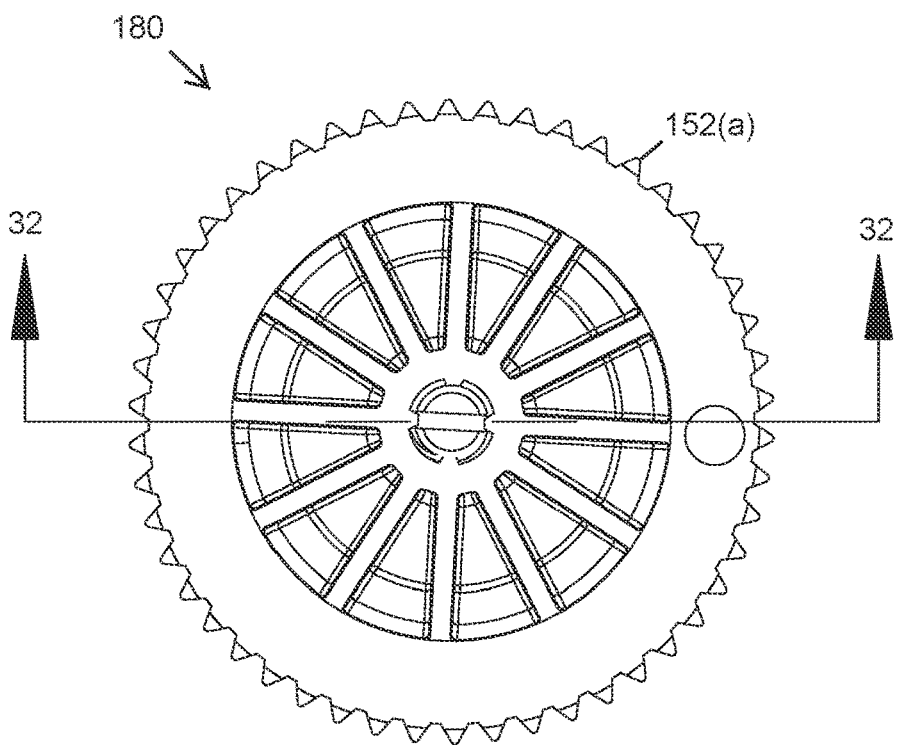
FIG. 31 is a top plan view of a nozzle that is similar to the nozzle from FIG. 19 except the lower member includes an impedance wall.
Figure 32:
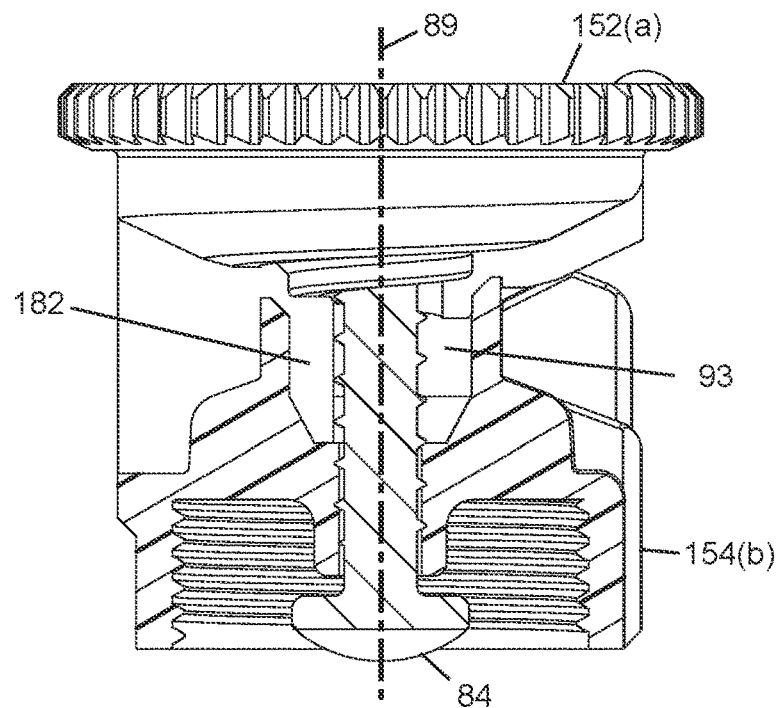
FIG. 32 is a cross-section view of the adjustable spray nozzle of FIG. 31 taken along line 32-32 in FIG. 31 and shows the impedance wall disposed within the central hole.

FIG. 31 is a top plan view of a nozzle 180 that is similar to the nozzle 150 from FIG. 19 except the lower member 154(b) includes an impedance wall 182 (FIG. 32). While the impedance wall 182 is illustrated in combination with certain features, for example, the one or more ribs 69 and the one or more ramps 67, the impedance wall 182 can be employed in a nozzle that does not include at least those other features.

FIG. 32 is a cross-section view of the adjustable spray nozzle 180 of FIG. 31 showing the impedance wall 182 disposed within the central hole 93. In certain embodiments, the impedance wall 182 inhibits water within the nozzle 180 from interfering with water flow exiting the downstream orifice 96 of the nozzle 180. In certain embodiments, the adjustable spray nozzle 180 includes the upper member 152(a) and the lower member 154(b). The lower member 154(b) is similar to the lower member 154(a) (FIG. 19-30) except, for example, the addition of the impedance wall 182. In the illustrated embodiment, the upper member 152(a) is rotatable relative to the lower member 154(b).

Figure 33:
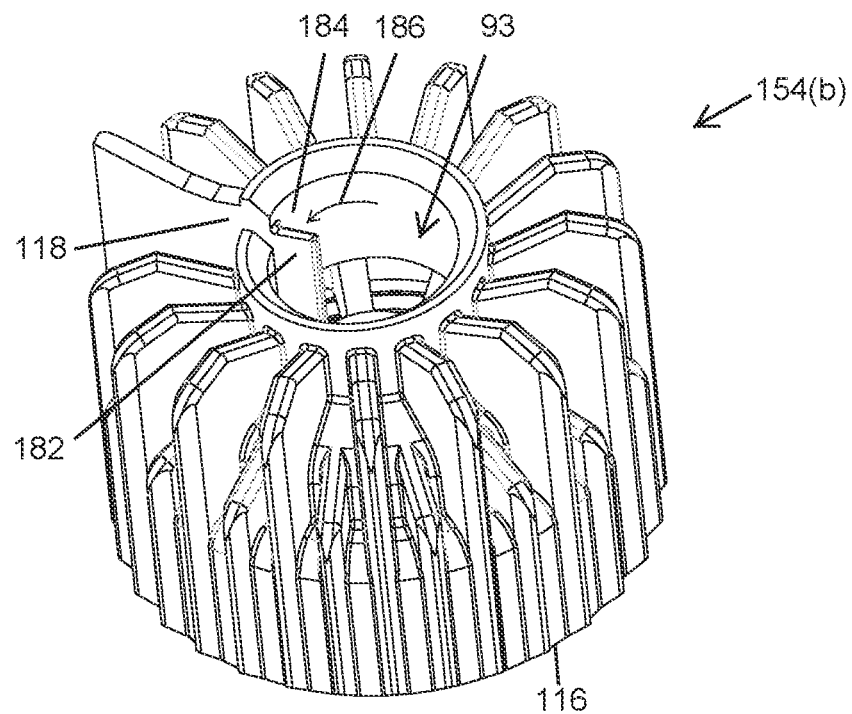
FIG. 33 is a perspective view of the lower member from the adjustable spray nozzle of FIG. 32 showing the impedance wall.
Figure 34:
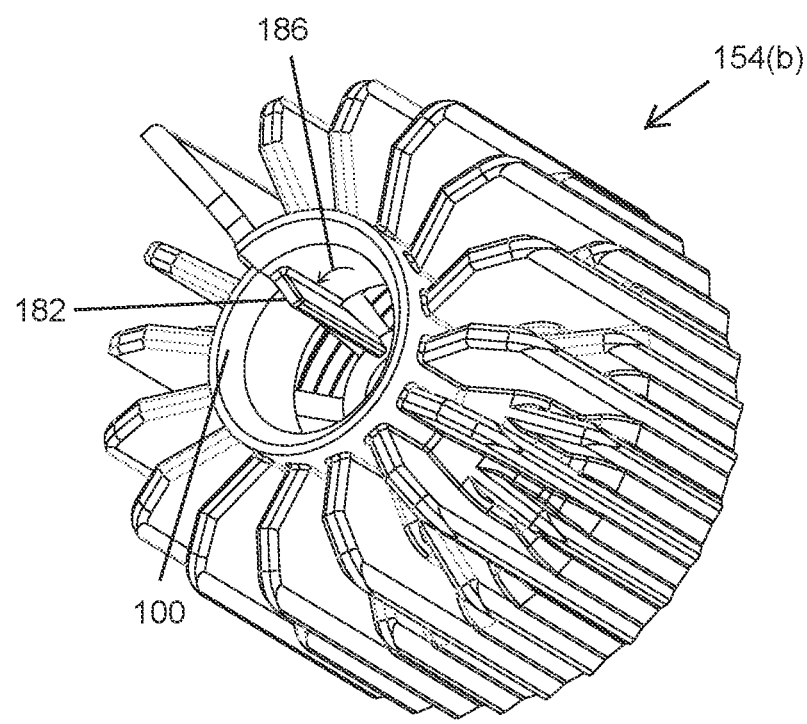
FIG. 34 is another perspective view of the lower member from the adjustable spray nozzle of FIG. 32 showing the impedance wall.

FIG. 33 is a perspective view of the lower member 154(b) from the adjustable spray nozzle 180 of FIG. 32 showing the impedance wall 182. FIG. 34 is another perspective view of the lower member 154(b) from the adjustable spray nozzle 180 of FIG. 32 showing the impedance wall 182. In certain embodiments, the first mating surface 100 has a helical shape relative to the central hole 93. In certain embodiments, the first mating surface 100 follows the helical shape from a low point to a high point relative to the bottom surface 116 along the first mating surface 100. In the illustrated embodiment, the first mating surface 100 has a generally planar shape. Of course, the first mating surface 100 can have a shape that is not a planar shape. For example, in certain embodiments, the first mating surface 100 has a curved shape.

In certain embodiments, the lower member 154(b) comprises the impedance wall 182 and the wall 118. In certain other embodiments, the lower member 154(b) comprises only the impedance wall 182. In certain embodiments, the impedance wall 182 projects from an edge of the wall 118 in an inward radial direction. In certain embodiments, the impedance wall 182 projects in a plane defined by the wall 118. For example, in certain embodiments, the impedance wall 182 projects inward toward the central axis 89 and into at least a portion of the manifold 98. In certain other embodiments, the impedance wall 182 is offset from a plane defined by the wall 118. In certain other embodiments, the impedance wall 182 is continuous with the wall 118. In other embodiments, the impedance wall 182 is discontinuous from the wall 118. For example, in certain embodiments, a gap exists between at least a portion of the wall 118 and the impedance wall 182.

In certain embodiments, the impedance wall 182 has a rectangular shape. In other embodiments, the impedance wall 182 has a shape other than rectangular. In certain embodiments, the impedance wall 182 has a planar shape. In other embodiments, the impedance wall 182 has a shape other than planar. In certain embodiments, the impedance wall 182 extends from the wall 118 to the screw 84. In certain embodiments, the impedance wall 182 extends from the wall 118, through the manifold 89, and to the screw 84

In certain embodiments, the impedance wall 182 inhibits water on a backside 184 of the arc opening from interfering with water flow exiting the downstream orifice 96 of the nozzle 180 in the arc opening. For example, in certain embodiments, the impedance wall 182 extends at least partially into the manifold 98 to separate at least a portion of the backside 184 from the arc opening. In this way, and in certain embodiments, water on the backside 184 is inhibited from flowing in a circumferential direction 186 and interfering with the water flowing along the flow path 65, 156 in a general radial direction towards the downstream orifice 96.

In certain embodiments, the impedance wall 182 extends across the entire manifold 98. In other embodiments, the impedance wall 182 extends across 50 percent of the manifold 98. In other embodiments, the impedance wall 182 extends across 25 percent of the manifold 98. In the illustrated embodiments, the impedance wall 182 extends across approximately 80 percent of the manifold 98. Of course, the impedance wall 182 is not limited to the listed values and can extend across the manifold 98 more or less than the listed values.

In certain embodiments, the impedance wall 182 extends in an axial direction for the entire length of manifold 98. In other embodiments, the impedance wall 182 extends in an axial direction across 50 percent of the manifold 98. In other embodiments, the impedance wall 182 extends in an axial direction across 25 percent of the manifold 98. In the illustrated embodiments, the impedance wall 182 extends in an axial direction across almost 100 percent of the manifold 98. Of course, the impedance wall 182 is not limited to the listed values and can extend in an axial direction across the manifold 98 more or less than the listed values.

Figure 35:
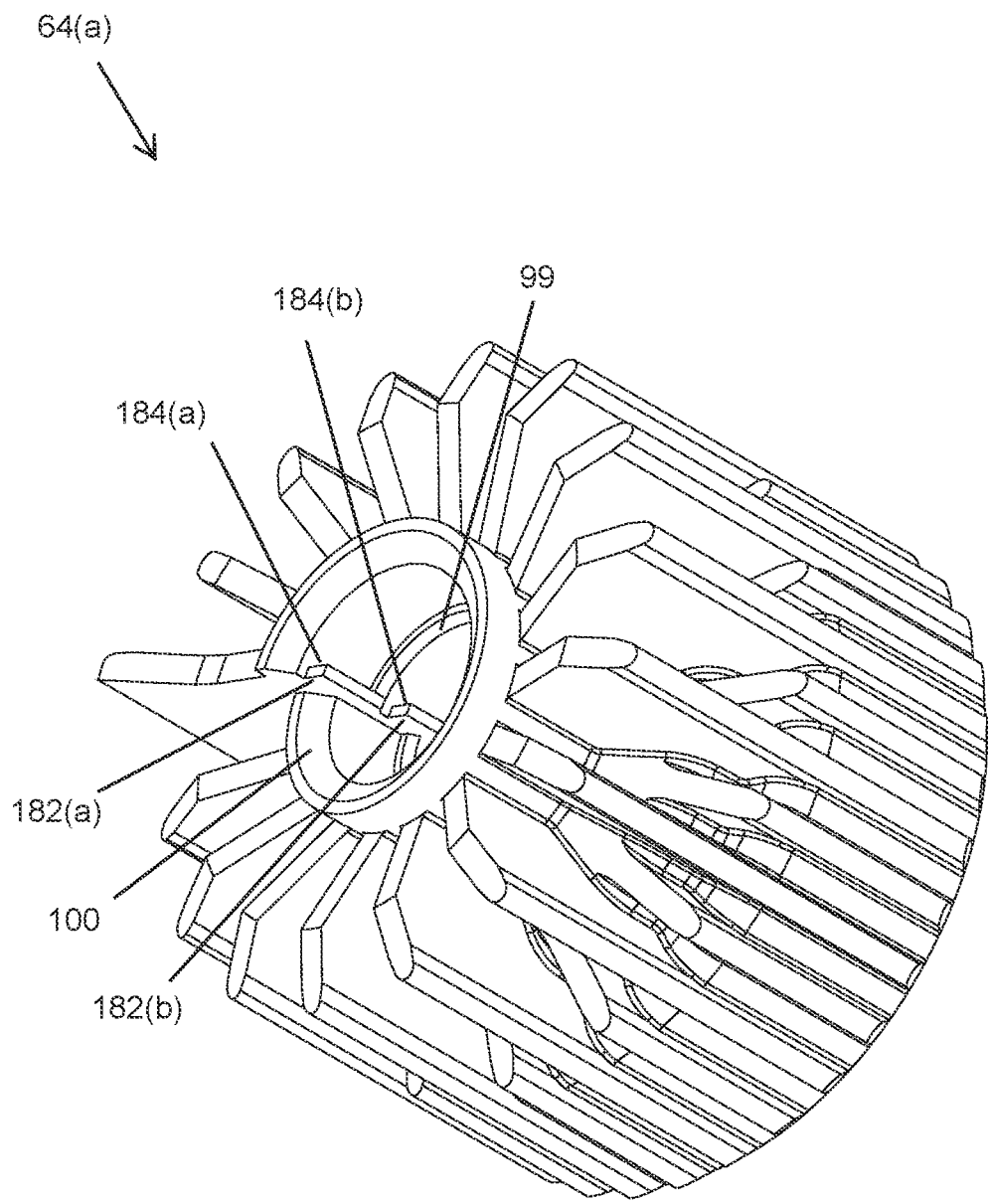
FIG. 35 is a perspective view of the lower member from the adjustable spray nozzle of FIG. 11A showing a segmented impedance wall.

FIG. 35 is a perspective view of the lower member 64(*a*) from the adjustable spray nozzle 60 of FIG. 1 showing a segmented impedance wall in the form of two impedance walls 182(*a*), 182(*b*). In certain embodiments, the lower member 64(*a*) can have more than two impedance walls 182(*a*), 182(*b*). In certain embodiments, the impedance wall 182(*a*) inhibits water on a backside 184(*a*) of the arc opening from interfering with water flow exiting the downstream orifice 100 of the nozzle 60 in the arc opening. In certain embodiments, the second impedance wall 182(*b*) inhibits water on a backside 184(*b*) of the arc opening from interfering with water flow exiting the upstream orifice 99 of the nozzle 60 in the arc opening. In certain embodiments, the lower member 64(*a*) can have both impedance walls 182(*a*), 182(*b*). In certain embodiments, the lower member 64(*a*) can have one of either the impedance wall 182(*a*) or the impedance wall 182(*b*).

Figure 36:
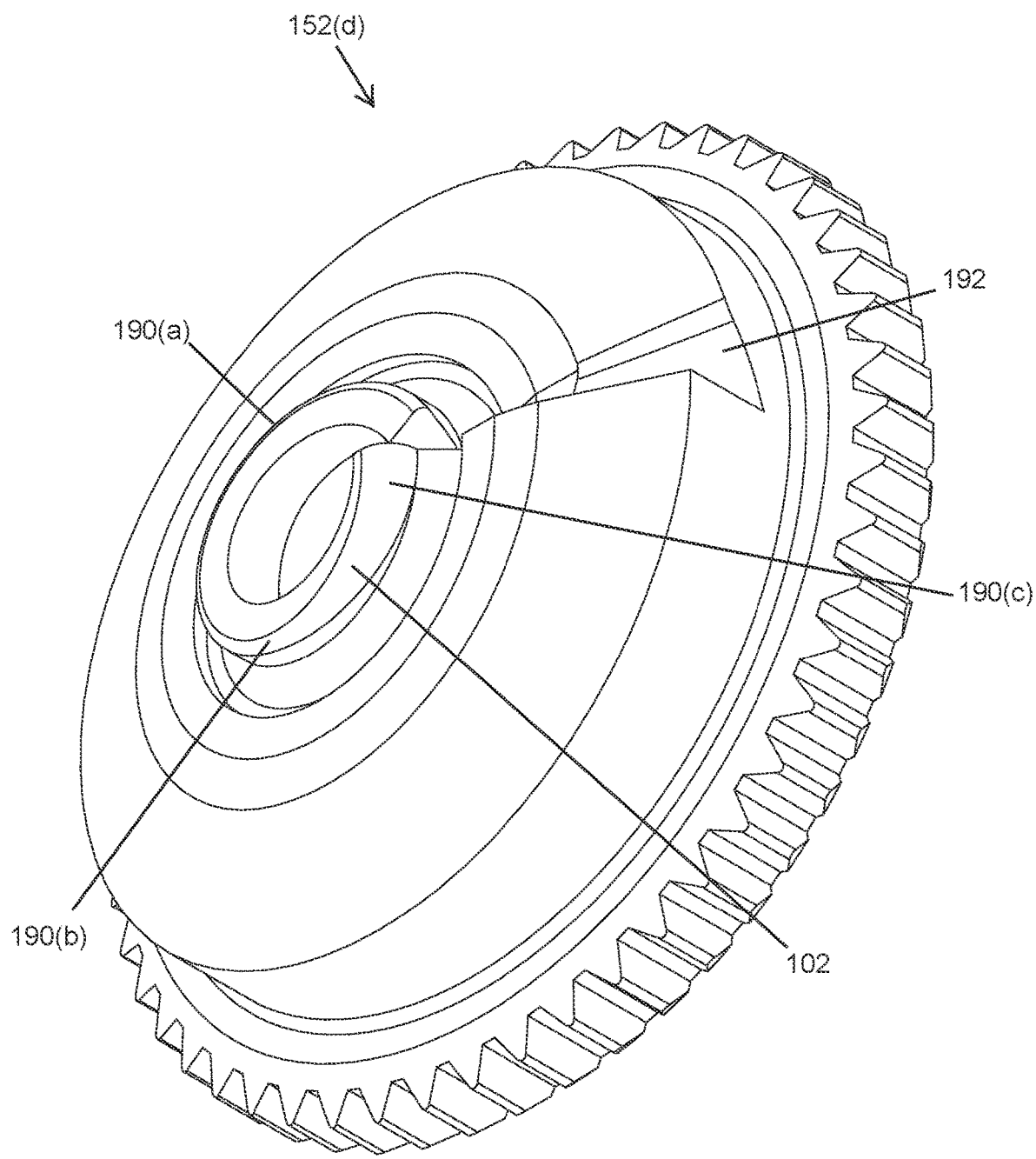
FIG. 36 is a bottom perspective view of an upper member that is similar to the upper member from FIGS. 19-26 except the upper member in FIG. 36 includes a downstream orifice that creates a gap with the lower member that varies along a length of the arc opening.
Figure 40:
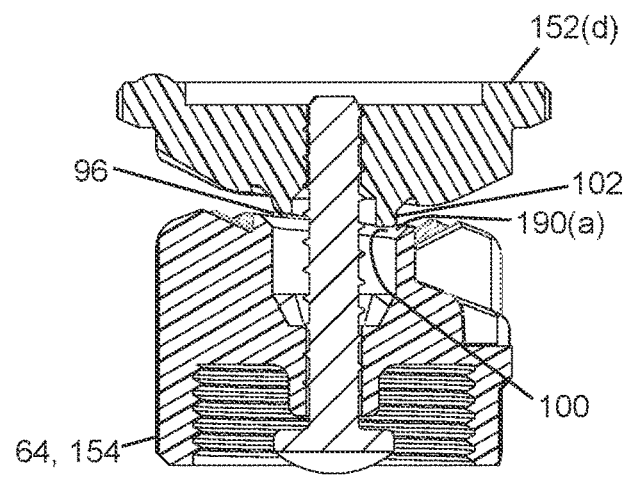
FIG. 40 is a cross-section view of the adjustable spray nozzle of FIG. 39 taken along line 40-40 in FIG. 39 and shows the variable gap between the upper member and the lower member.

FIG. 36 is a bottom perspective view of an upper member 152(*d*) that is similar to the upper member 152(*a*) from FIGS. 19-26 except the upper member 152(*d*) includes a downstream orifice 96 that creates a gap 190 with the lower member 64, 154 that varies along a length of the arc opening. The gap 190 is formed by the second mating surface 102 of the upper member 152(*d*) and the first mating surface 100 of the lower member 64, 154 (FIG. 40).

In certain embodiments, the gap 190 varies along the length of the arc opening of the adjustable spray nozzle 60, 150, 180. In the illustrated embodiment of FIG. 36, the gap 190 gradually increases from a minimum at 0 degrees to the end of the selected arc opening. For example, in the illustrated embodiment of FIG. 36, the gaps 190(*a*), 190(*b*), 190(*c*) have values of 0.024 inches at 180 degrees, 0.025 inches at 270 degrees, and 0.034 inches at 360 degrees, respectively. Of course, the listed values are only exemplary and the gap 190 can have any value(s) that vary in some way along the length of the arc opening. In certain other embodiments, the gap 190 gradually decreases from 0 degrees to the end of the selected arc opening.

Figure 37:
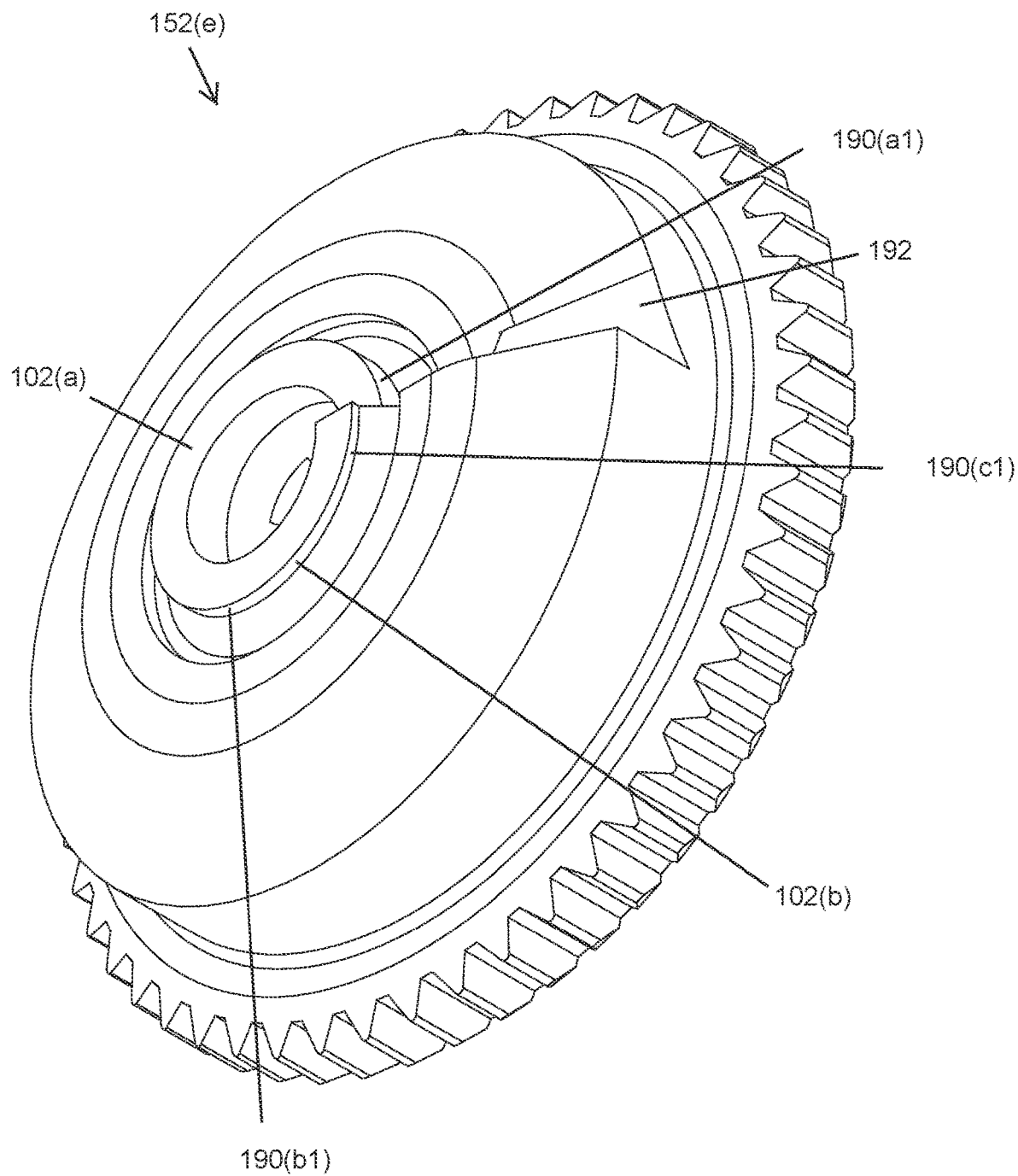
FIG. 37 is a bottom perspective view of an upper member that is similar to the upper member from FIG. 36 except the upper member in FIG. 37 includes a downstream orifice with a sharper edge that creates a gap with the lower member that varies along a length of the arc opening.

FIG. 37 is a bottom perspective view of an upper member 152(*e*) that is similar to the upper member 152(*d*) from FIG. 36 except the upper member 152(*e*) has a variable pitched surface 102(*a*) that creates a gap 190 with the lower member 64, 154 that varies along a length of the arc opening. The gap 190 is formed by the corner of the second mating surface 102(*a*) and 102(*b*) of the upper member 152(*e*) and the first mating surface 100 of the lower member 64, 154 (FIG. 40). For example, in certain embodiments, the downstream orifice 96 of the upper member 152(*e*) has a sharper edge than the downstream orifice 96 of the upper member 152(*d*).

In certain embodiments, the gap 190 varies along the length of the arc opening of the adjustable spray nozzle 60, 150, 180. In the illustrated embodiment of FIG. 37, the gap 190 gradually increases from a minimum at 0 degrees to the end of the selected arc opening. For example, in the illustrated embodiment of FIG. 37, different wall heights of wall 102(*b*) at points 190(*a1*), 190(*b1*), 190(*c1*) can mate with the first mating surface 100 to create the gaps 190(*a1*), 190(*b1*), 190(*c1*) with values of 0.024 inches at 10 degrees, 0.025 inches at 270 degrees, and 0.034 inches at 360 degrees, respectively. Of course, the listed values are only exemplary and the gap 190 can have any value(s) that vary in some way along the length of the arc opening. In certain other embodiments, the gap 190 gradually decreases from 0 degrees to the end of the selected arc opening.

In certain embodiments, the upper member 152(*d*), 152(*e*) comprises a swept cut 192. The swept cut 192 is configured to enhance a distribution of water at the edge of the water spray pattern. More specifically, in the examples illustrated, additional water flows through the swept cut 192 at the edge of the arc opening. In certain embodiments, the swept cut 192 on the underside of the upper member 152(*d*), 152(*e*) takes the form of an upward taper that accentuates the helical shape of the upper member 152(*d*), 152(*e*). In certain embodiments, the swept cut 192 is located adjacent to the wall 120.

Figure 38:
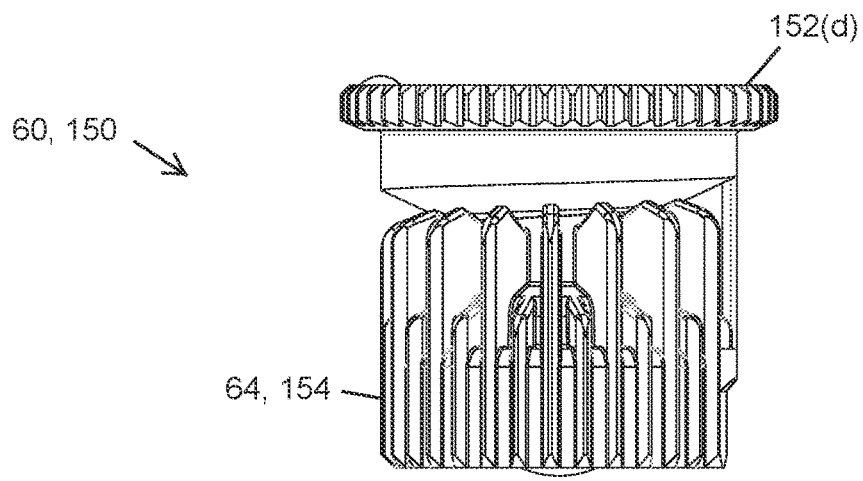
FIG. 38 is a side plan view of an embodiment of the spray nozzle that includes the upper member from FIG. 36.

FIG. 38 is a side plan view of an embodiment of the spray nozzle 60, 150, 180 that includes the upper member 152(*d*) from FIG. 36. In certain embodiments, the gap 190 varies in width along at least a portion of the length of the arc opening. In certain embodiments, the variation in width of the gap 190 is predetermined based on the predicted precipitation rates of the nozzle 60, 150, 180 along the arc opening. Varying the width of the gap 190 as opposed to employing a fixed width can correct for uneven precipitation rates that are caused by energy losses and restrictions in the flow path 65, 156. The energy losses and restrictions in the flow path 65, 156 can vary in magnitude along the length of the arc opening. For example, the precipitation rate close to an end of the selected arc opening can be lower than the precipitation rate farther from the end of the selected arc opening due to higher energy losses occurring at the end of the selected arc opening. Varying the width of the gap 190 can correct for variations in energy loses within the nozzle 60, 150, 180 resulting in more even precipitation rates across the length of the arc opening. In this way, in certain embodiments, the spray nozzle 60, 150, 180 can provide a matched, or near matched precipitation rate from zero to 360 degrees within the arc opening.

In the illustrated embodiment, the gap 190 has a variable width for at least a portion of the length of the arc opening. In certain embodiments, the gap 190 has a first width at a first location within the arc opening and a second width at a second location within the arc opening. The second width is different than the first width. Of course, the gap 190 can have more than two widths within the arc opening. For example, the gap 190 in the illustrated embodiment has an infinite number of different widths due to the smooth taper of the second mating surface 102 within the arc opening.

In certain embodiments, the transition between the first location and the second location is a step. In certain embodiments, the transition between the first location and the second location is gradual. In certain embodiments, the transition between the first location and the second location is a smooth taper.

In certain embodiments, the variable width of the gap 190 is created by geometric variations in one or both of the first and second mating surfaces 100, 102, respectively. For example, in the illustrated embodiment, the variable width is created by geometric variations in the second mating surface 102. In other embodiments, the variable width is created by geometric variations in the first mating surface 100. In other embodiments, the variable width is created by geometric variations in both first and second mating surfaces 100, 102, respectively.

In certain embodiments, the geometric variations in one or both of the first and second mating surfaces 100, 102, respectively, are changes in a chamfer that forms one or both of the first and second mating surfaces 100, 102, respectively. In certain embodiments, the geometric variations in one or both of the first and second mating surfaces 100, 102, respectively, are changes in a radius that forms one or both first and second mating surfaces 100, 102, respectively. In the illustrated embodiment (FIG. 36), the geometric variations in the second mating surface 102 are changes in a radius that forms the second mating surface 102. Of course, the geometric variations in one or both of the first and second mating surfaces 100, 102, respectively, are not limited to changes in chamfers and radii and also include other geometric changes made to one or both of the first and second mating surfaces 100, 102, respectively, that corrects the flow rate through the downstream orifice 96 within the arc opening to provide a matched, or near matched precipitation rate from zero to 360 degrees within the arc opening. For example, FIG. 37 shows another embodiment where the mating surface 102 has a sharp edge that is formed to create a variable width gap 190.

Figure 39:
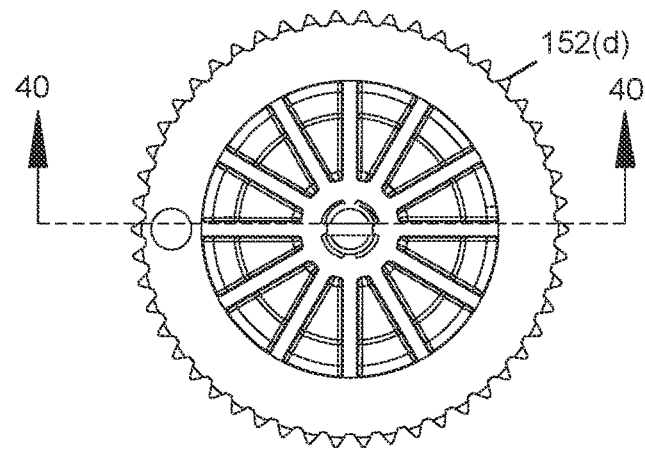
FIG. 39 is a top plan view of the upper member from FIG. 38 rotated relative to the lower member with the gap providing a 180 degree arc of water flow.

FIG. 39 is a top plan view of the upper member 152(d) from FIG. 38 rotated relative to the lower member 64, 154 with the gap 190 providing a 180 degree arc of water flow. Within the 180 degree arc opening, the flow of water from the downstream orifice 96 provides matched, or near matched precipitation across the 180 degree arc opening. Varying the width of the gap 190 corrects for variations in energy loses within the nozzle 60, 150, 180.

In the illustrated embodiment, the downstream orifice 96 is formed between portions of the upper member 152(d) and the lower member 64, 154. In the illustrated embodiment, the first mating surface 100 on the lower member 64, 154 and the second mating surface 102 on the upper member 152(d) together form the downstream orifice 96. In this way, the gap 190 is defined between the first mating surface 100 and the second mating surface 102 in the flow path 65, 156. Outside of the arc opening, the first mating surface 100 is disposed in the recess 106 in the upper member 152(d) closing the gap 190 and the downstream orifice 96.

FIG. 40 is a cross-section view of the adjustable spray nozzle 60, 150, 180 of FIG. 39 taken along line 40-40 in FIG. 39 and shows the gap 190 between the upper member 152(d) and the lower member 64, 154. In the illustrated embodiment, the gap 190 gradually increases from 0 degrees to 180 degrees with the gap 190(a) reaching 0.024 inches at 180 degrees. Of course, the listed value for the gap 190 is only exemplary and the gap 190 can have any other value.

Figure 41:
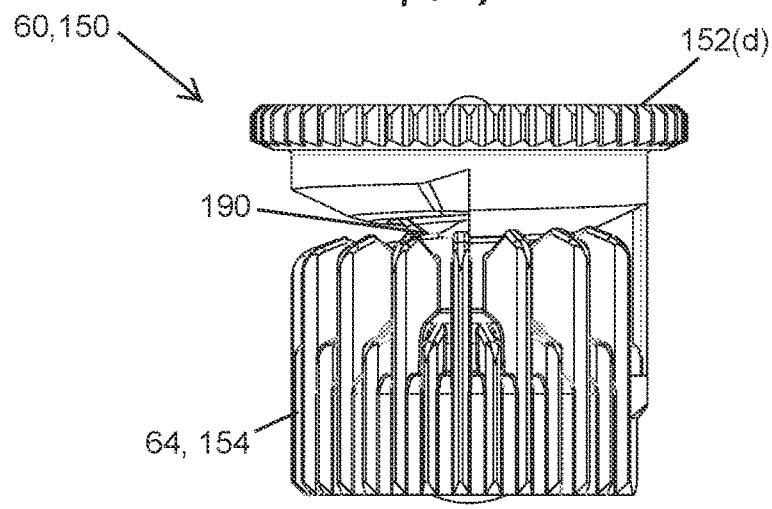
FIG. 41 is a side plan view of the spray nozzle from FIG. 38 with the upper member rotated relative to the lower member to provide a 270 degree arc of water flow.

FIG. 41 is a side plan view of the spray nozzle 60, 150, 180 from FIG. 38 with the upper member 152(d) rotated relative to the lower member 64, 154 to provide a 270 degree arc of water flow. In the illustrated embodiment, the geometric variations in the second mating surface 102 are changes in a radius that forms the second mating surface 102. Of course, the geometric variations in one or both of the first and second mating surfaces 100, 102, respectively, are not limited to changes in chamfers and radii and also include other geometric changes made to one or both of the first and second mating surfaces 100, 102, respectively, that corrects the flow rate through the downstream orifice 96 within the arc opening to provide a matched or near matched precipitation rate from zero to 360 degrees within the arc opening.

Figure 42:
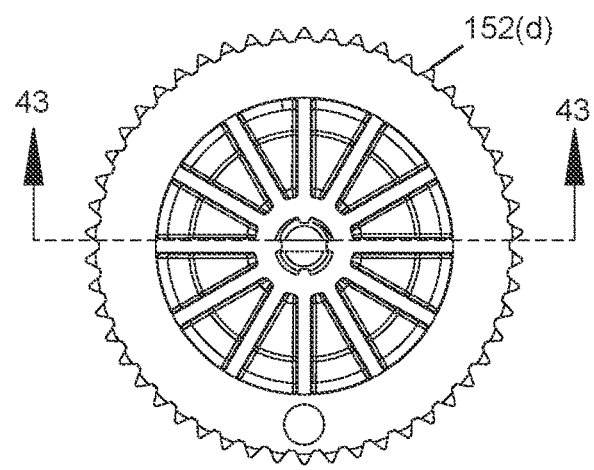
FIG. 42 is a top plan view of the upper member from FIG. 41.

FIG. 42 is a top plan view of the upper member 152(d) from FIG. 41. Within the 270 degree arc opening, the flow of water from the downstream orifice 96 provides matched precipitation across the 270 degree arc opening. Varying the width of the gap 190 corrects for variations in energy loses within the nozzle 60, 150, 180.

In the illustrated embodiment, the downstream orifice 96 is formed between portions of the upper member 152(d) and the lower member 64, 154. In the illustrated embodiment, the first mating surface 100 on the lower member 64, 154 and the second mating surface 102 on the upper member 152(d) together form the downstream orifice 96. In this way, the gap 190 is defined between the first mating surface 100 and the second mating surface 102 in the flow path 65, 156. Outside of the arc opening, the first mating surface 100 is disposed in the recess 106 in the upper member 152(d) closing the gap 190 and the downstream orifice 96.

Figure 43:
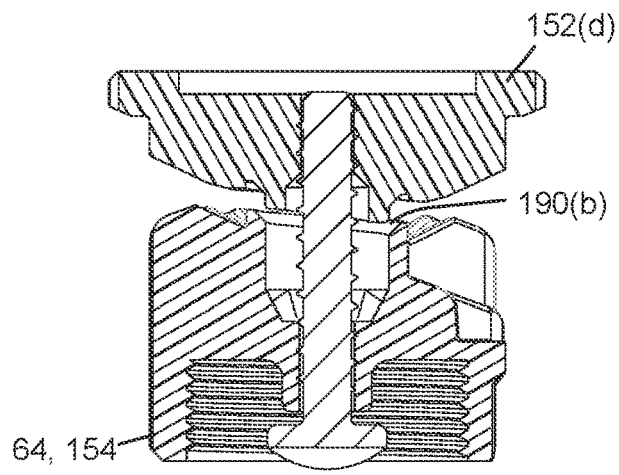
FIG. 43 is a cross-section view of the adjustable spray nozzle of FIG. 42 taken along line 43-43 in FIG. 42 and shows the gap between the upper member and the lower member.

FIG. 43 is a cross-section view of the adjustable spray nozzle 60, 150, 180 of FIG. 42 taken along line 43-43 in FIG. 42 and shows the gap 190 between the upper member 152(d) and the lower member 64, 154. In the illustrated embodiment, the gap 190 gradually increases from 0 degrees to 270 degrees with the gap 190(b) reaching 0.025 inches at 270 degrees. Of course, the listed value for the gap is only exemplary and the gap 190 can have any other value.

Figure 44:
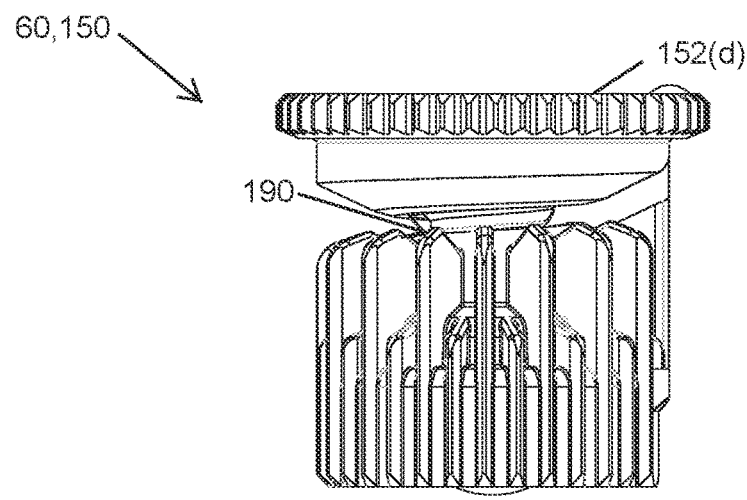
FIG. 44 is a side plan view of the spray nozzle from FIG. 38 with the upper member rotated relative to the lower member to provide a 360 degree arc of water flow.

FIG. 44 is a side plan view of the spray nozzle 60, 150, 180 from FIG. 38 with the upper member 152(d) rotated relative to the lower member 64, 154 to provide a 360 degree arc of water flow. In the illustrated embodiment (FIG. 36), the geometric variations in the second mating surface 102 are changes in a radius that forms the second mating surface 102. Of course, the geometric variations in one or both of the first and second mating surfaces 100, 102, respectively, are not limited to changes in chamfers and radii and also include other geometric changes made to one or both of the first and second mating surfaces 100, 102, respectively, that corrects the flow rate through the downstream orifice 96 within the arc opening to provide a matched or near matched precipitation rate from zero to 360 degrees within the arc opening.

Figure 45:
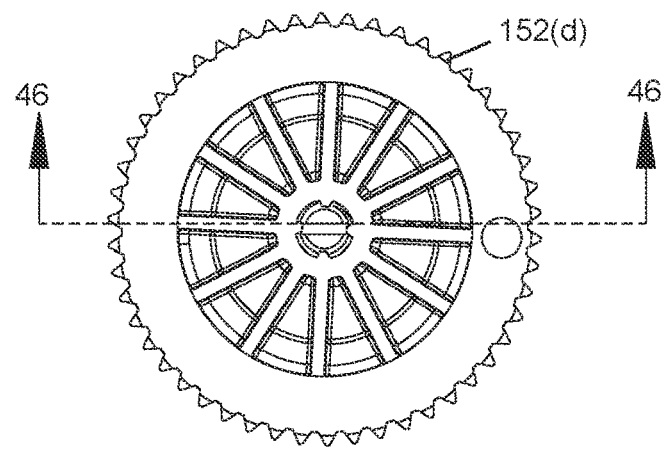
FIG. 45 is a top plan view of the upper member from FIG. 44.

FIG. 45 is a top plan view of the upper member 152(d) from FIG. 44. Within the 360 degree arc opening, the flow of water from the downstream orifice 96 provides matched precipitation across the 360 degree arc opening. Varying the width of the gap 190 corrects for variations in energy loses within the nozzle 60, 150, 180.

In the illustrated embodiment, the downstream orifice 96 is formed between portions of the upper member 152(d) and the lower member 64, 154. In the illustrated embodiment, the first mating surface 100 on the lower member 64, 154 and the second mating surface 102 on the upper member 152(d) together form the downstream orifice 96. In this way, the gap 190 is defined between the first mating surface 100 and the second mating surface 102 in the flow path 65, 156. Outside of the arc opening, the first mating surface 100 is disposed in the recess 106 in the upper member 152(d) closing the gap 190 and the downstream orifice 96.

Figure 46:
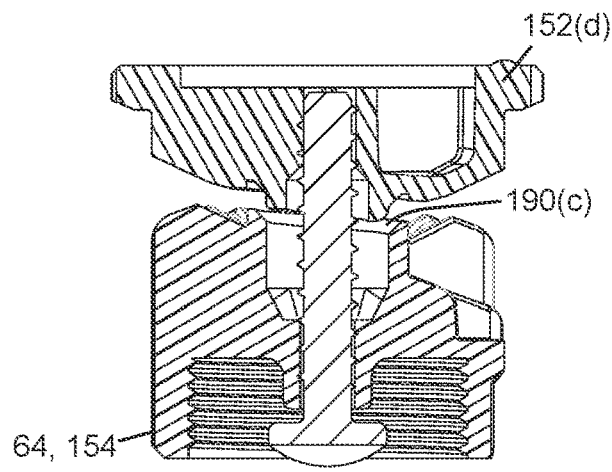
FIG. 46 is a cross-section view of the adjustable spray nozzle of FIG. 45 taken along line 46-46 in FIG. 45 and shows the gap between the upper member and the lower member.

FIG. 46 is a cross-section view of the adjustable spray nozzle 60, 150, 180 of FIG. 45 taken along line 46-46 in FIG. 45 and shows the gap 190 between the upper member 152(d) and the lower member 64, 154. In the illustrated embodiment, the gap 190 gradually increases from 0 degrees to 360 degrees with the gap 190(c) reaching 0.034 inches at 360 degrees. Of course, the listed value for the gap 190 is only exemplary and the gap 190 can have any other value.

While I have described an embodiment of an adjustable arc irrigation spray nozzle configured for enhanced watering, it will be apparent to those skilled in the art that my invention can be modified in both arrangement and detail. Therefore, the protection afforded my invention should only be limited in accordance with the scope of the following claims.

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the nozzle has been disclosed in the context of certain embodiments and examples, it will be understood by those skilled in the art that the nozzle and subassemblies extend beyond the specifically disclosed embodiments to other alternative embodiments and/or uses of the embodiments and certain modifications and equivalents thereof. Accordingly, it is intended that the scope of the nozzle herein-disclosed should not be limited by the particular disclosed embodiments described above but should be determined only by a fair reading of the claims that follow.

What is claimed is:

1. An adjustable spray nozzle comprising:
a lower member and an upper member rotatably coupled to the lower member to vary a length of an arc opening for water to exit the nozzle, the lower member and the upper member defining a path for the water to flow from a passage within the lower member to an exit of the nozzle, the path including an upstream orifice located downstream from the passage, a manifold located downstream of the upstream orifice, and a downstream orifice located downstream of the manifold, the upstream orifice defining a first gap, the downstream orifice defining a second gap, and the manifold defining a third gap, the third gap being sized greater than the first gap to cause a sudden expansion and drop in pressure of the water exiting the first gap and entering the manifold,
wherein varying the length of the arc opening by rotating the upper member relative to the lower member varies both a length of the first gap and a length of the second gap.

2. The adjustable spray nozzle of claim 1, wherein a cross-sectional area of the third gap is greater than a cross-sectional area of the first gap.

3. The adjustable spray nozzle of claim 1, wherein the second gap is smaller than the third gap.

4. The adjustable spray nozzle of claim 1, wherein the exit is configured to create a fan-shape for the water exiting the nozzle.

5. The adjustable spray nozzle of claim 1, wherein the upper member follows a helical path about a central axis of the nozzle when rotated relative to the lower member.

6. The adjustable spray nozzle of claim 1, wherein the upper member and the lower member are connected by a screw.

7. The adjustable spray nozzle of claim 6, wherein the lower member includes a central sleeve through which the screw is threaded.

8. The adjustable spray nozzle of claim 1, wherein the lower member has a threaded segment configured to screw to a riser.

9. The adjustable spray nozzle of claim 1, wherein the manifold is configured to decrease a range of water otherwise distributed from the exit.

10. The adjustable spray nozzle of claim 1, wherein the upper member and the lower member have generally cylindrical shapes.

11. An adjustable spray nozzle comprising:
a lower member and an upper member rotatably coupled to the lower member to vary a length of an arc opening for water to exit the nozzle, the lower member and the upper member defining a path for the water to flow from a passage within the lower member to an exit of the nozzle, the path including a plurality of orifices and a manifold, the manifold being disposed between at least two orifices of the plurality of orifices, at least one of the plurality of orifices defining a gap upstream of the manifold, the gap being sized smaller than the manifold to cause a sudden expansion and drop in pressure of the water exiting the gap and entering the manifold,
wherein another of the plurality of orifices defines a second gap, and wherein varying the length of the arc opening varies both a length of the gap and a length of the second gap.

12. The adjustable spray nozzle of claim 11, wherein the second gap is disposed downstream of the manifold.

13. The adjustable spray nozzle of claim 11, wherein the second gap is sized smaller than the manifold.

14. The adjustable spray nozzle of claim 11, wherein the manifold is disposed between portions of the lower member and the upper member.

15. The adjustable spray nozzle of claim 11, wherein the manifold has a generally annular shape.

16. The adjustable spray nozzle of claim 11, wherein the upper member follows a helical path about a central axis of the nozzle when rotated relative to the lower member.

17. An adjustable spray nozzle comprising:
a lower member having an inlet;
an upper member rotatably coupled to the lower member to vary a length of an arc opening for water to exit the nozzle;
a flow path defined by the lower member and the upper member for the water to flow from the inlet to the arc opening;
an upstream orifice disposed along the flow path and downstream from the inlet, the upstream orifice defining a first gap;
a downstream orifice disposed along the flow path and downstream from the upstream orifice, the downstream orifice defining a second gap; and
a manifold disposed along the flow path and between the upstream orifice and the downstream orifice, the manifold defining a third gap that is sized greater than the first gap to cause a sudden expansion and drop in pressure of the water exiting the first gap and entering the manifold,
wherein varying the length of the arc opening varies both a length of the first gap and a length of the second gap.

18. The adjustable spray nozzle of claim 17, wherein the second gap is sized smaller than the third gap.

19. The adjustable spray nozzle of claim 17, wherein the manifold is disposed between portions of the lower member and the upper member.

20. The adjustable spray nozzle of claim 17, wherein the upper member and the lower member are connected by a screw.

* * * * *